(12) United States Patent
Schneider et al.

(10) Patent No.: US 10,784,686 B2
(45) Date of Patent: Sep. 22, 2020

(54) GRID STABILIZATION USING ADJUSTED VOLTAGE REGULATOR RESPONSE TO GRID CHARACTERISTICS

(71) Applicant: Battelle Memorial Institute, Richland, WA (US)

(72) Inventors: Kevin P. Schneider, Seattle, WA (US); Francis K. Tuffner, Seattle, WA (US); Jacob Hansen, Seattle, WA (US); Yingying Tang, Richland, WA (US); Nikitha Radhakrishnan, Richland, WA (US); Priya Thekkumparambath Mana, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 93 days.

(21) Appl. No.: 15/875,981

(22) Filed: Jan. 19, 2018

(65) Prior Publication Data
US 2019/0173285 A1 Jun. 6, 2019

Related U.S. Application Data

(60) Provisional application No. 62/595,524, filed on Dec. 6, 2017.

(51) Int. Cl.
*H02J 3/38* (2006.01)
*H02J 3/24* (2006.01)

(52) U.S. Cl.
CPC .............. *H02J 3/381* (2013.01); *H02J 3/24* (2013.01)

(58) Field of Classification Search
CPC .. H02J 3/381; H02J 3/382; H02J 3/383; H02J 3/386; H02P 9/00; H02P 9/42

USPC .......................................................... 307/84
See application file for complete search history.

(56) References Cited

U.S. PATENT DOCUMENTS

| | | | |
|---|---|---|---|
| 8,183,826 B2 | 5/2012 | Tuffner et al. | |
| 8,478,452 B2 | 7/2013 | Pratt et al. | |
| 8,700,225 B2 | 4/2014 | Pratt et al. | |
| 9,441,889 B2 | 9/2016 | Tugurlan et al. | |
| 9,589,297 B2 | 3/2017 | Fuller et al. | |
| 9,753,440 B2 | 9/2017 | Pratt et al. | |
| 9,954,363 B2 | 4/2018 | McCullough et al. | |
| 9,991,711 B2 | 6/2018 | Black et al. | |

(Continued)

OTHER PUBLICATIONS

ABB, Volt/VAR Management Software (VVMS) for Smart Grid Distribution Automation Applications, document dated Jan. 2011, 8 pages.

(Continued)

*Primary Examiner* — Hal Kaplan
(74) *Attorney, Agent, or Firm* — Klarquist Sparkman, LLP

(57) ABSTRACT

Apparatus and methods are disclosed for control systems for improving stability of electrical grids by temporarily reducing voltage output of electrical generators responsive to transient events on an electrical grid. In one example of the disclosed technology, a controller is coupled is to an automatic voltage regulator, which in turn adjusts excitation current of an electrical generator responsive to changes in frequency detected for the electrical grid. Reducing the output voltage temporarily allows for smaller generators to provide power to the microgrid. Methods for selecting parameters determining how the controller generates a regulation signal used to adjust the excitation current are further disclosed.

36 Claims, 16 Drawing Sheets

(56) References Cited

U.S. PATENT DOCUMENTS

| | | | |
|---|---|---|---|
| 10,177,697 B2 | 1/2019 | Mukoyama et al. | |
| 2012/0139241 A1* | 6/2012 | Haj-Maharsi | F03D 7/0224 |
| | | | 290/44 |
| 2016/0091539 A1 | 3/2016 | Williams et al. | |
| 2016/0315472 A1 | 10/2016 | McCullough et al. | |
| 2017/0288413 A1* | 10/2017 | Varadarajan | H02J 7/007 |
| 2018/0131200 A1 | 5/2018 | Crawford et al. | |
| 2019/0020220 A1 | 1/2019 | Lian et al. | |

OTHER PUBLICATIONS

ABB, Volt-VAr management solutions for Smart Grid Distribution Automation Applications, document dated Apr. 2013, 12 pages.

Alimisis et al., "Voltage-VAr Optimization (VVO) future trends, challenges and opportunities," in *proc. IEEE Power & Energy Society Innovative Smart Grid Technologies Conference*, Apr. 2017, 5 pages.

Arnold et al., "Extremum Seeking Control of Smart Inverters for VAR compensation," in *proc. IEEE Power and Energy Society General Meeting*, Jul. 2015, 5 pages.

Barr et al., "Spiders Phase II Technical Report," Burns & McDonnell, [Online] Available: https://www.energy.gov/sites/prod/files/2014/05/f15/spiders_industry_day_technical_report_2014.pdf, May 2014, 36 pages.

De Steese et al., "Conservation Voltage Reduction Potential in the Pacific Northwest," in *proc. Energy Conversion Engineering Conference*, Aug. 1990, pp. 43-47.

Eto et al., "Frequency Control Requirements for Reliable Interconnection Frequency Response," LBNL-2001103, Lawrence Berkley National Laboratory, Feb. 2018, 29 pages.

Eto et al., "Use of Frequency Response Metrics to Assess the Planning and Operating Requirements for Reliable Integration of Variable Renewable Generation," LBNL-4142E, Ernest Orlando Lawrence Berkley National Laboratory, Dec. 2010, 141 pages.

Farrokhabadi et al., "Frequency Control in Isolated/Islanded Microgrids Through Voltage Regulation," *IEEE Transactions on Smart Grid*, vol. 8, No. 3, May 2017, pp. 1185-1194.

IEEE PES Distribution Systems Analysis Subcommittee Radial Test Feeders, [Online] Available: http://ewh.ieee.org/soc/pes/dsacom/testfeeders/index.html, 2017, 1 page.

Jovanovic et al., "Digital System for Power Line Frequency Measurement," *Proc. XLVIII ETRAN Conference*, vol. I, Jun. 2004, pp. 29-32.

Kennedy et al., "Conservation Voltage Reduction (CVR) at Snohomish County PUD," *IEEE Transactions on Power Systems*, vol. 6, No. 3, Aug. 1991, pp. 986-998.

Kirschner, "Implementation of Conservation Voltage Reduction at Commonwealth Edison," *IEEE Transaction on Power Systems*, vol. 5, No. 4, Nov. 1990, pp. 1178-1182.

Lauria, "Conservation Voltage Reduction (CVR) at Northeast Utilities," *IEEE Transactions on Power Delivery*, vol. 2, No. 4, Oct. 1987, pp. 1186-1191.

Lesieutre et al., "Phasor Modeling Approach for Single Phase A/C Motors," in *proc. IEEE Power and Energy Society General Meeting*, Jul. 2008, 7 pages.

Manbachi et al., "Impact of V2G on Real-time Adaptive Volt/VAr Optimization of Distribution Networks," in *proc. IEEE Electrical Power & Energy Conference*, Aug. 2013, .6 pages.

Hope & Wilson, Industrial Voltage Optimization at Large Industrial Facility Brings Energy Savings, ACEEE Summer Study on Energy Efficiency in Industry, document dated 2011, 12 pages.

"Recommendations for Updating the Technical Requirements for Inverters in Distributed Energy Resources," Smart Inverter Working Group, document dated Jan. 2014, http://www.energy.ca.gov/electricity_analysis/rule21/documents/recommendations_and_test_plan_documents/Recommendations_for_updating_Technical_Requirements_for_Inverters_in_DER_2014-02-07-CPUC.pdf, 91 pages.

S&C Electric Company, IntelliTeam® VV Volt-VAR Optimization System, Mar. 12, 2016, 2 pages.

Schneider et al., "Analytic Considerations and Design Basis for the IEEE Distribution Test Feeders," *In Review IEEE Trans. On Power System*, vol. 33, No. 3, May 2018, pp. 3181-3188.

Schneider et al., "Adaptive Dynamic Simulations for Distribution Systems Using Mult-State Load Models," *IEEE Trans. On Smart Grid*, vol. 10, No. 2, Mar. 2019, pp. 2257-2266.

Schneider et al., "Enabling Resiliency Operations Across Multiple Microgrids With Grid Friendly Appliance Controllers," *IEEE Transactions on Smart Grid*, vol. 9, No. 5, Sep. 2018, pp. 4755-4764.

Schneider et al., "Evaluating the Feasibility to Use Microgrids as a Resiliency Resource," *IEEE Transactions on Smart Grid*, vol. 8, No. 2, Mar. 2017, pp. 687-696.

Schneider et al., "Evaluating the Magnitude and Duration of Cold Load Pick-up on Residential Distribution Feeders Using Multi-State Load Models," *IEEE Transactions on Power Systems*, vol. 31, No. 5, Sep. 2016, pp. 3765-3774.

Schneider, "Evaluation of Conservation Voltage Reduction (CVR) on a National Level," PNNL-19596, Pacific Northwest National Laboratory, Richland, Washington, Jul. 2010, 114 pages.

Schneider et al. "Improving Primary Frequency Response to Support Networked Microgrid Operations," DOI 10.1109/TPWRS.2018.2859742, IEEE Transactions on Power Systems, Jul. 2018, 9 pages.

Schneider et al., "A Method for Evaluating Volt-VAR Optimization Field Demonstrations," *IEEE Transactions on Smart Grid*, vol. 5, No. 4, Jul. 2014, pp. 1696-1703.

Schneider et al., "Multi-State Load Models for Distribution System Analysis," *IEEE Transactions on Power Systems*, vol. 26, No. 4, Nov. 2011, pp. 2425-2433.

Shi et al., "A Decentralized Volt/Var Optimization Scheme for Smart Distribution Systems," in *proc. IEEE Power & Energy Society Innovative Smart Grid Technologies Conference*, Sep. 2016, 5 pages.

Singh et al., "Effects of Distributed Energy Resources on Conservation Voltage Reduction (CVR)," *2011 IEEE Power and Energy Society General Meeting*, Jul. 2011, 7 pages.

Tuffner et al., "Grid Friendly Appliance Controllers to Increase the Dynamic Stability of Networked Resiliency-based Microgrids," *2018 IEEE/PES Transmission and Distribution Conference and Exposition (T&D)*, Apr. 2018, 5 pages.

Tuffner et al., "Modeling Load Dynamics to Support Resiliency-based Operations in Low-Inertia Microgrids," *IEEE Transactions on Smart Grid*, Mar. 2018, 12 pages.

"Turbine-Governor Models Standard Dynamic Turbine-Governor Systems in NEPLAN Power System Analysis Tool," NEPLAN V555 [Online] Available: http://www.neplan.ch/wp-content/uploads/2015/08/Nep_TURBINES_GOV.pdf, undated, 99 pages.

Van De Vyver et al., "Droop Control as an Alternative Inertial Response Strategy for the Synthetic Inertia on Wind Turbines," *IEEE Trans. On Power Systems*, vol. 31, No. 2, Mar. 2016, pp. 1129-1138.

Wilson et al., "Saving Megawatts with Voltage Optimization," in *proc, Industrial Technology Conference*, Mar. 2010, 10 pages.

Woodward easYgen-3000 Series, [Online] Available: http://www.woodward.com/easYgen3000Series.aspx, 3 pages.

Xu et al., "Microgrids for Service Restoration to Critical Load in a Resilient Distribution System," *IEEE Transactions on Smart Grid*, vol. 9, No. 1, Jan. 2018, pp. 426-437.

Battelle Memorial Institute, gridlab-d / generators / diesel.dg.cpp, document dated Feb. 12, 2012, downloaded from https://github.com/gridlab-d/gridlab-d/blob/feature/730/generators/diesel_dg.cpp on Oct. 23, 2019, 107 pages.

\* cited by examiner

GRID STABILIZATION USING ADJUSTED VOLTAGE REGULATOR RESPONSE TO GRID CHARACTERISTICS

CROSS-REFERENCE TO RELATED APPLICATIONS

This application claims the benefit of U.S. Provisional Application No. 62/595,524, filed Dec. 6, 2017, which application is incorporated herein by reference in its entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

COMPUTER PROGRAM LISTING APPENDIX

Reference is made to the computer program listing submitted herewith via Electronic Filing System (EFS). A single file is included with this EFS submission that is entitled "appendix.txt," an ASCII text file that was created on Jan. 4, 2018, and has a size of 10,954 bytes. The material contained in the appendix.txt file is hereby incorporated by reference herein.

SUMMARY

Apparatus and methods are disclosed for control systems for regulating voltage output of power sources, such as electrical generators to increase stability of electrical grids, including micro grids. In some implementations, temporarily reducing voltage output of an electrical generator responsive to transient events on a grid can reduce active and reactive power consumption at end-use loads powered by the grid. The voltage output can be temporarily reduced responsive to changes in electrical characteristics of the power grid detected at the electrical generator and/or other points in the system. For example, deviations in frequency of the power grid can be addressed by temporarily reducing voltage output of an electrical generator responsive to detecting the deviations. Stability of the power grid can thereby be increased. Further, deploying electrical generators having controller configurations disclosed herein can allow for deployment of reduced capacity generators, which in turn can reduce the cost of building and maintaining such micro grids.

As microgrids continue to be deployed for resiliency applications, the desire to integrate higher penetrations of inverter-connected generation will reduce their dynamic stability. To mitigate the costs associated with oversizing rotating equipment to maintain stability, example methods and apparatus are disclosed for adapting electrical generators, for example diesel generators, with controllers used to change energy consumption of their end-use loads. This can result in a reduction in electrical torque observed by distributed energy resources (DERs), which results in a behavior that is in some way similar to that seen with the emulation of inertia associated with synchronized rotating masses. Thus, it is demonstrated that electrical grids such as microgrids can use smaller generation units, which in turn leads to quantifiable reductions in capital, operating, and maintenance costs.

In one example of the disclosed technology, a method includes adjusting voltage output of a power source coupled to a power grid based on at least one electrical characteristic measured at the output of the power source. For example, the electrical characteristic can be AC frequency measured for the power grid. The method can further include adjusting voltage output of one or more electrical generators based on deviations in the measured frequency from a nominal frequency for the power grid. In some examples, a regulation signal is generated, which in turn can be used to adjust excitation field current of a generator based on deviations in the measured frequency. Selection of other parameters used by a controller for implementing disclosed methods are also disclosed. In some examples, the method can further include adjusting a bias voltage input for an automatic voltage regulator coupled to the power source.

In some examples of the disclosed technology, a system such as a micro-grid system includes a power generator that is configured to supply power to a grid via an electrical output terminal. A regulator in communication with the power generator is configured to adjust output voltage of the power generator in response to variations in frequency measured at the electrical output terminal. In some examples, the variations in frequency may be measured at other points within the generator, or at other points in the power grid. In some examples, the controller is configured to generate a regulation signal responsive to the measured variations in frequency. An automatic voltage regulator (AVR) is configured to adjust output voltage of the power generator in response to the regulation signal by adjusting field excitation current of the power generator. In some examples, other parameters such as exponential delay can be included in the controller system to further adjust operation of the controller. In some examples, the AVR includes solid state components, such as insulated-gate bipolar transistors (IGBTs) used to adjust the output voltage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

DETAILED DESCRIPTION

I. General Considerations

Figure 1:
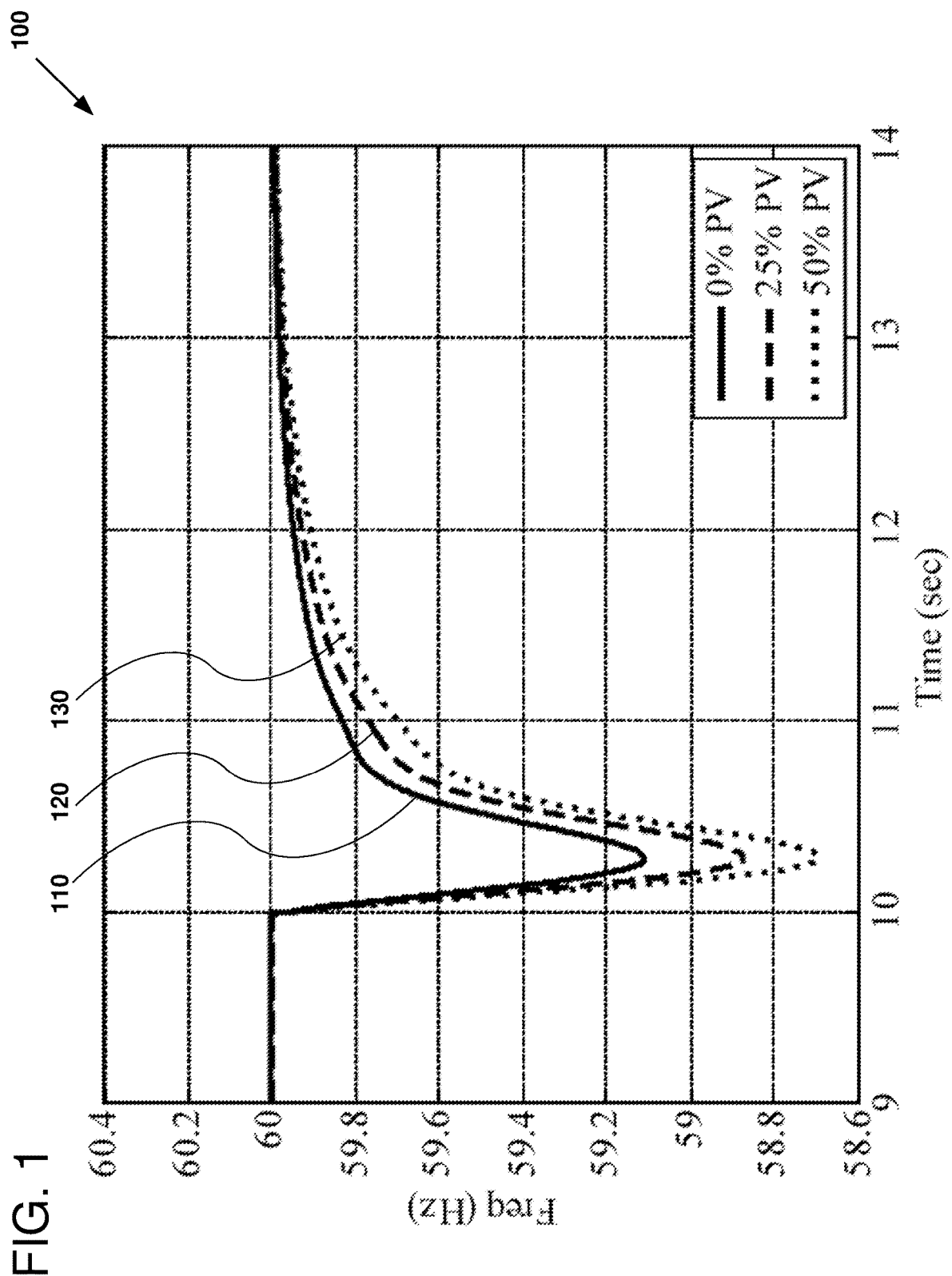
FIG. 1 is a chart showing frequency deviation for various penetrations of photovoltaic sources in a microgrid deployed according to certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "adjust," "deploy," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including microcontrollers or servers that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to electrical generators or inverted-connected power sources. For example, the integrated circuit can be embedded in or otherwise coupled to a generator (e.g., a diesel-based generator, a gasoline-based generator, a gas-based generator, a wind-based generator, a solar-based generator, a coal-based generator, or a nuclear generator). As will be readily understood to one of ordinary skill in the relevant art having the benefit of the present disclosure, a single controller can be used to control one, two, or more generators. Similarly, multiple generators each having their own associated controller can be deployed in a single system.

II. Introduction to the Disclosed Technology

Electrical power grids are becoming more complex and it is increasingly difficult to provide consistent power during events. Microgrids can provide uninterrupted power to critical end-use load during severe events, but the proliferation of inverter-connected assets creates significant operational challenges. Microgrids are local energy grids that can disconnect from a traditional electrical power grid and can provide uninterrupted power to critical end-use load during extreme events. When microgrids are designed for existing installations it is common for diesel generators to be sized such that the generators are rarely, if ever, operated at high load levels. Additionally, for new installations there is a trend for selected diesel generators to be oversized, or for additional units to be installed, to ensure stability during transient events. While the larger generating units ensure that the microgrid will maintain service to critical end-use loads during a transient, much of the units' capacity may not be used the majority of the time. This leads to units running at lower levels of efficiency, lead to increased capital costs, and increase maintenance costs due to generator wet stacking. As a result, despite the ability to support critical loads, high capital costs and operating and maintenance (O&M) costs have proven to be a barrier to the deployment of microgrids.

As the penetration of inverter-connected generation increases, the system inertia decreases and the stability of the microgrid also decreases. In other approaches, the low system inertia is addressed by oversizing the rotating machines on the system, typically diesel generators. While the oversizing of units does provide additional inertia, the increased capital and operating costs can become a barrier to deployment. In certain disclosed examples, a method of using voltage regulating equipment in a microgrid is provided to generate a synthetic inertia that emulates the inertia associated with synchronized rotating masses. Using this control system, it is possible to use smaller rotating machines that provide an inertial response of larger units. The control system will reduce the capital and operating costs, while maintain stability, thereby reducing potential barriers to microgrid deployment.

As an alternative to the installation of additional, or larger units, it is possible to increase the utilization of the control systems on existing generators. For example, by engaging voltage regulation equipment on microgrid distributed energy resources (DERs), power grids can realize increased stability during system transients, switching operations, load changes, and/or tripping of generating assets. Power source output can be adjusted by voltage regulation equipment in accordance with the Conservation Voltage Reduction (CVR) effect.

The CVR effect is a phenomenon by which a reduction in grid voltage levels results in a reduction of active and reactive power consumption at end use loads. System losses may also be reduced as well, although typically to a lesser extent. For example, the CVR effect can be employed by controlling voltage regulators and shunt capacitors to reduce system voltages to the low end of the ANSI C84.1 Range A band. Such systems have demonstrated the ability to increase energy efficiency at the distribution level by reducing the energy required to supply the demand of the end-use customers, and to a lesser extent system losses.

Typical CVR schemes use shunt capacitors, load tap changers, or other techniques to affect the end-use loads, typically over the time frame of minutes to hours, to reduce peak load or annual energy consumption. In deployed systems, CVR has been used to affect the end-use load on time-scales longer than a second, but such schemes have not operated on time-scale that can affect dynamic stability.

The inability to affect dynamic stability in such schemes can be attributed to the fact that most commercial schemes control voltage using a combination of voltage regulators and shunt capacitors, devices which have built in time delays, and electro-mechanical actuators.

In certain examples of the disclosed technology, control methods use existing voltage regulation equipment on DERs to increase microgrid stability. In particular, certain disclosed methods engage generator Automatic Voltage Regulators (AVRs) on the millisecond time-scale to mitigate the deviations in frequency that occur in low inertia microgrids when a transient occurs. According to one aspect, by engaging the AVR on DERs makes use of the voltage-dependent flexibility of end-use loads to provide a synthetic inertia to the system. The engagement of the end-use load flexibility allows for smaller rotating machines (e.g., generators) to exhibit the inertial response of larger units. For example, a 2,500 kVA generator configured with an AVR implemented according to one example will provide a similar frequency deviation as a 3,500 kVA generator during a step increase in load.

As will be readily understood by one of ordinary skill in the relevant are having the benefit of the present disclosure, many of the examples disclosed herein discuss controllers adapted for a single electrical generator. However, the disclosed technology can be adapted to control two or more controllers and/or generators in a grid system. Further, non-rotational generators, for example, inverter-connected battery and photovoltaic sources can be adapted to use the disclosed technology.

III. Example Operational Considerations of Resiliency-Based Microgrids

Resiliency-based microgrids differ from other microgrids because they are specifically designed to continue operation during extreme events. As a result, resiliency-based microgrids often incorporate high penetrations of renewable generation to provide sustained operations when fuel supplies are disrupted. In certain disclosed examples, microgrids with up to 50% renewable sources (defined as the ratio of peak load to DER nameplate capacity), are discussed, as will be readily apparent to one of ordinary skill in the art having the benefit of the present disclosure.

Dynamics of Low-Inertia Microgrids

As the penetration of inverter-connected generation increases on a microgrid, the system inertia decreases. As a result, switching and load transients will result in larger frequency and voltage deviations. FIG. 1 is a chart 100 illustrating changes in frequency of an example microgrid that can be used in certain examples of the disclosed technology due to a step increase in load for 3 different penetration levels of inverter-connected photovoltaic (PV) generation: 0% PV (110), 25% PV (120), and 50% PV (130). The x-axis is time in seconds, and the y-axis is grid frequency in Hertz. For the three cases shown in FIG. 1, it is assumed that as the penetration of PV increases, the penetration of rotating generation power sources is correspondingly reduced, thus leading to the reduced system inertia.

As can be seen from FIG. 1, with a lower inertia it is more likely that transients on the system will be large enough to trip inverters (e.g., IEEE STD 1547-A compliant inverters), which can lead to the collapse of the microgrid. One solution is to increase the system inertia by over-sizing the rotating generation assets, but this has other negative impacts.

Efficiency of Generating Assets

Figure 2:
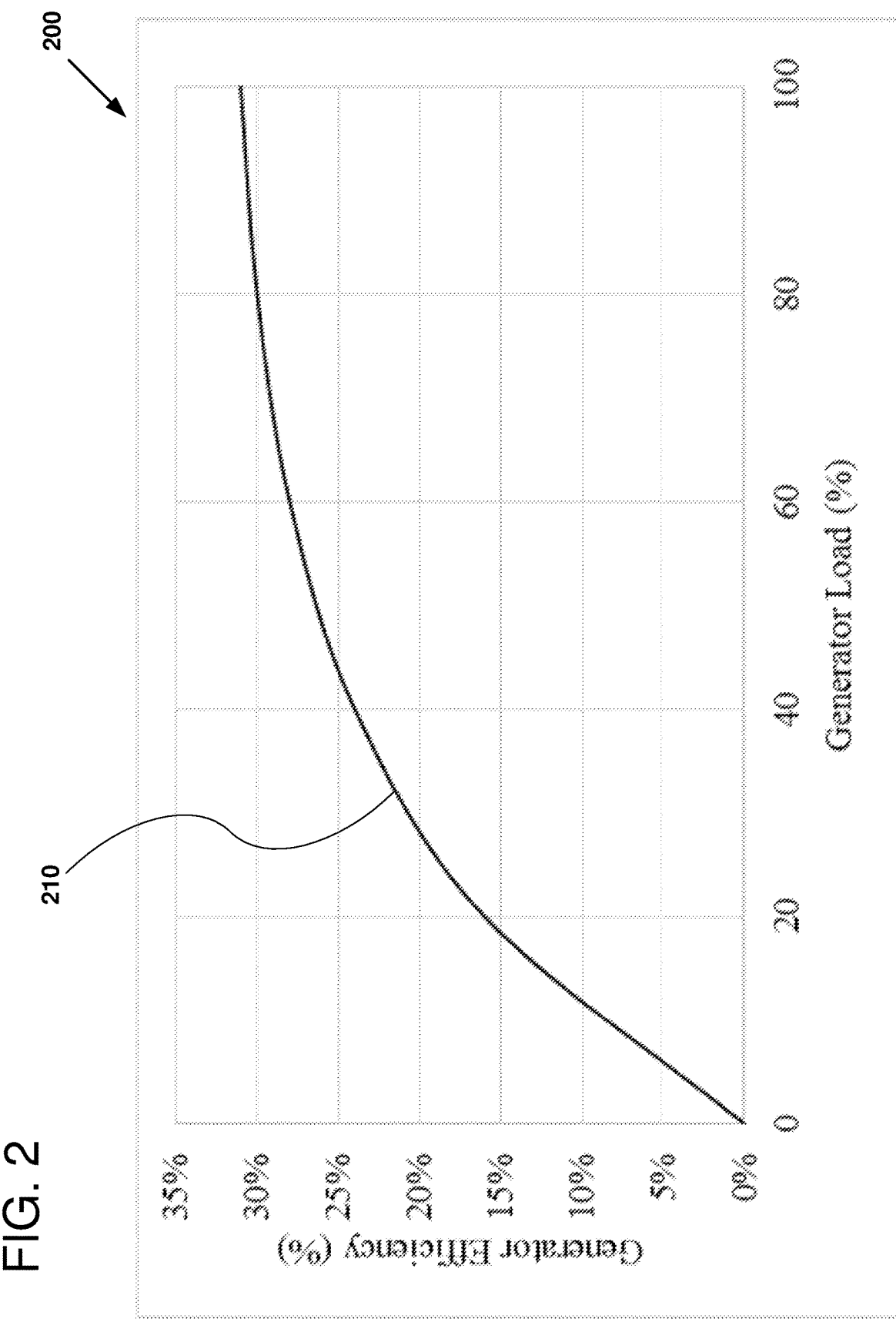
FIG. 2 is a chart that shows a typical diesel generator efficiency curve, as can be employed in certain examples of the disclosed technology.

While over-sizing diesel generation assets will increase the system inertia, increasing dynamic stability, it can negatively impact system efficiency. In particular, diesel generators have non-linear efficiency curves and operating at a partial load results in decreased efficiency and in increased maintenance costs. FIG. 2 is a chart 200 that plots a typical efficiency curve 210 for a diesel generator, as can be employed in certain examples of the disclosed technology.

In addition to efficiency considerations, there are O&M considerations for operating diesel generators at higher loading levels. At higher loading levels, (e.g., greater than 60% and in some examples, greater than 90%), the operating temperature of the units are higher to prevent a condition known as "wet stacking." Wet stacking occurs at lower temperatures where complete fuel combustion does not occur. This condition results in added maintenance and additional decreases in efficiency that are not accounted for in the typical efficiency curve 210 of FIG. 2; the typical efficiency curve assumes no wet stacking.

As a result of efficiency considerations, oversized generators may provide a higher degree of dynamic stability, but they result in less efficient operations. Additionally, the lower efficiency will lead to an increase in fuel consumption, which could be detrimental if the microgrid needs to operate separated from the grid for an extended period of time.

Thus, it is desirable to use properly-sized diesel generators that are operated at high load levels for efficiency, but to have the ability to minimize frequency deviations during transient conditions.

IV. Example Adjustable Power Source Configuration

Figure 3:
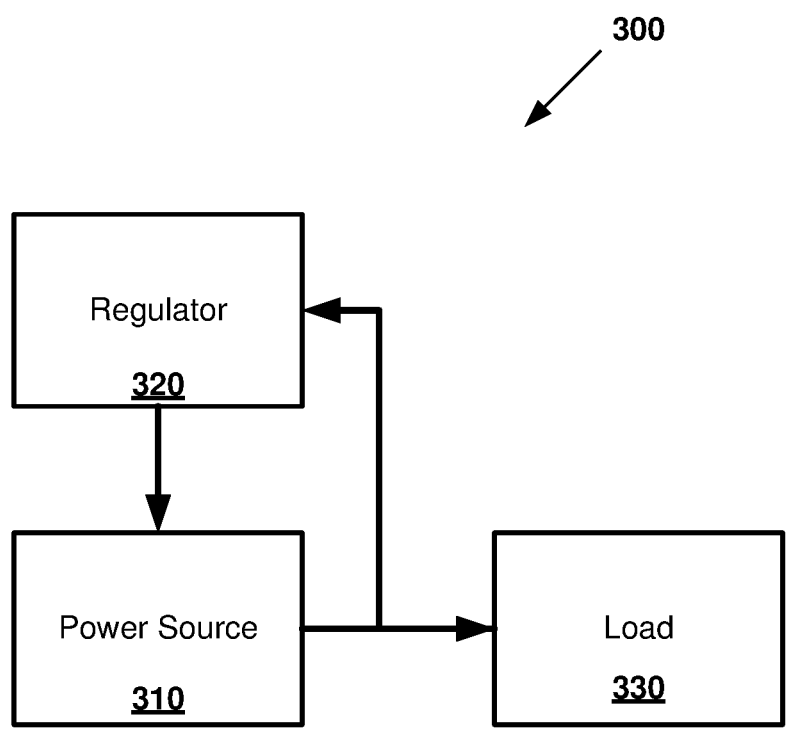
FIG. 3 is a block diagram of an example system including a regulator, as can be implemented in certain examples of the disclosed technology.

FIG. 3 is a block diagram 300 of an environment including an adjustable power source, as can be employed in certain examples of the disclosed technology. As shown in FIG. 3, an adjustable power source 310 receives regulation input from a regulator 320. The power source 310 transmits power to a load 330. The regulator 320 is configured to sample electrical characteristics at the output of this power source 310.

The power source 310 can be implemented using any suitable power generation technology. For example, the power source 310 can include an electrical generator, such as a diesel generator, natural gas generator, gasoline generator, or a hydropower generator. In some examples, the power source 310 can be an inverter-connected DC voltage source such as a photovoltaic array, fuel cell, rectified microgrid turbine output, or a battery. The power source 310 is configured to provide power according to one or more output voltage parameters. For example, if the power source is an AC power source, the nominal output voltage is 120 V RMS (root mean square). The controller can further adjust the nominal output voltage. In some examples, a reference voltage is provided to the power source 310 that sets the nominal output voltage level of the power source output. The output voltage level of the power source 310 can be adjusted by a regulation signal generator generated by the regulator 320. For example, the regulator 320 can include a controller (e.g., implemented as a general-purpose processor, a microcontroller, a circuit, an Application Specific Integrated Circuit (ASIC), a Field Programmable Gate Array (FPGA), or other suitable control implementation technology). Based on electrical characteristics measured from the output of the power source 310, the regulator 320 adjusts the regulation signal to control the output voltage level of the power source 310 to achieve a desired output voltage level.

The load 330 can be any suitable electrical load for receiving power from the power source 310. In some examples, the load 330 is an electrical power grid. In some examples, the load 330 is a microgrid, which is designed to provide resilient operation and in some cases to decouple from a larger electrical grid. Examples of applications of such microgrids can include institutional settings, such as corporate or academic campuses, hospitals, military installations, or other suitable environments.

V. Example Voltage Regulation Environment

Figure 4:
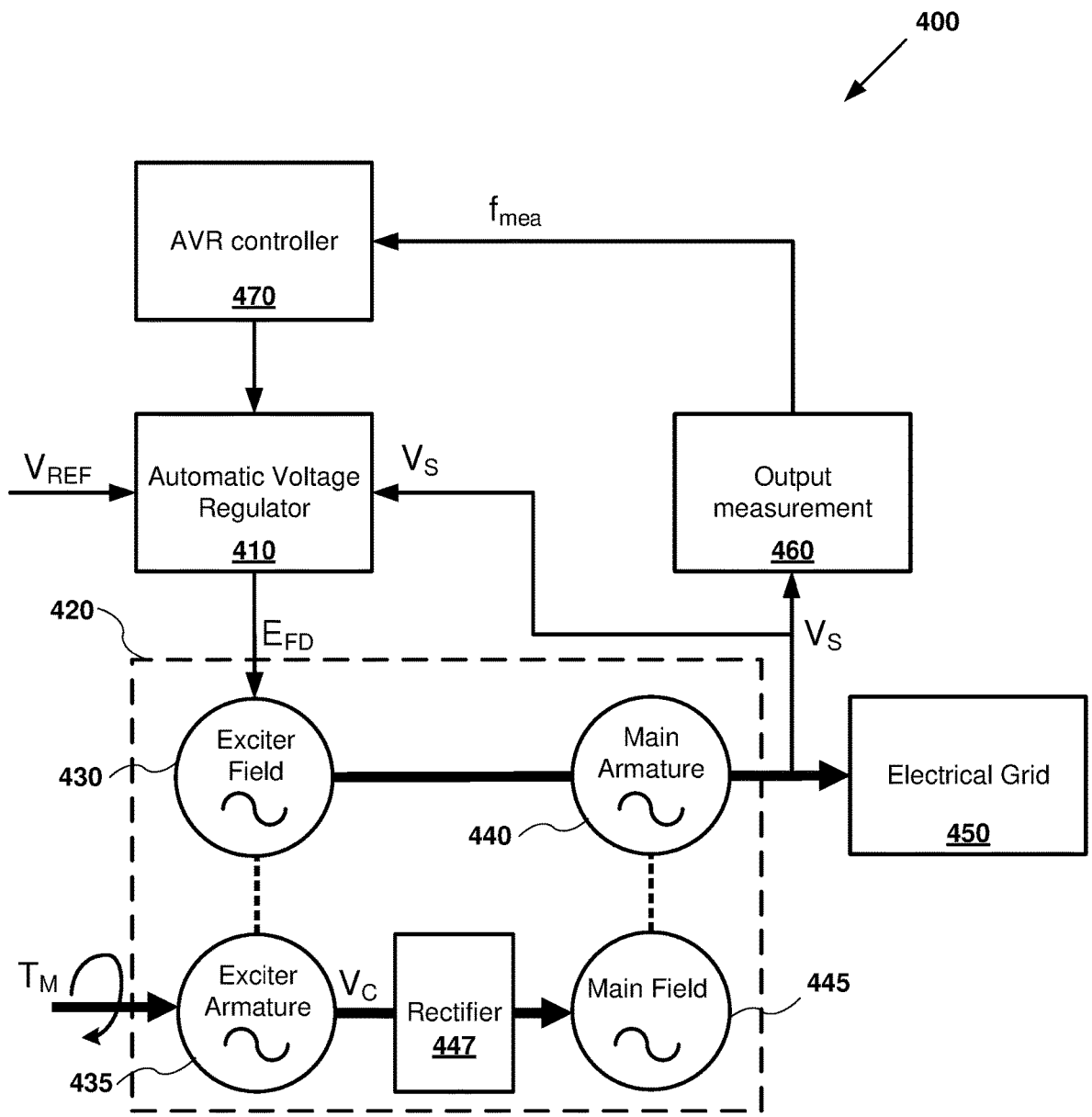
FIG. 4 is a block diagram of an automatic voltage regulator coupled to an electrical generator, as can be implemented in certain examples of the disclosed technology.

FIG. 4 is a block diagram 400 outlining an example environment in which an automatic voltage regulator (AVR) is coupled to an electrical generator configured to provide power to an electrical grid.

As shown in FIG. 4, an automatic voltage regulator 410 can receive a number of inputs including a reference voltage $V_{REF}$ and a voltage measured on an output terminal $V_S$ of an electrical generator 420. The automatic voltage regulator 410 adjusts the voltage output of the electrical generator 420 by adjusting excitation field current ($E_{FD}$) provided to the electrical generator. Changes in the provided excitation field current in turn adjust the field generated by the electrical generator 420.

In further detail, the excitation field current ($E_{FD}$) is provided to the exciter field of the electrical generator 420. The exciter field 430 in turn is electrically coupled to the main armature 440, which are both situated in the stator portion of the electrical generator. The electrical generator 420 further includes an exciter armature 435 and a main field 445, which are electrically coupled via a rectifier 447. The voltage output at the exciter armature 435 is $V_C$. The exciter armature 435 and the main field 445 are situated in a rotor portion of the electrical generator 420. As a rotational force $T_M$ is applied to the rotor, the exciter armature 435 and the main field 445 will turn and induce a magnetic field in the stator portion of the electrical generator 420. This generates an alternating current at a terminal output of the electrical generator 420 that is transmitted to an electrical grid 450.

The voltage output at the voltage terminal of the electrical generator 420 is denoted $V_S$. An output measurement unit 460 can measure the output voltage $V_S$ and determine the frequency at which the output voltage is changing. For example, the output measurement unit 460 can periodically measure the voltage at the electrical generator 420 output. In other examples, the output measurement unit 460 can measure voltage peaks and troughs in the output voltage signal, or account the number of times the output voltage crosses a predetermined voltage level, in order to measure frequency at the electrical generator 420 output. This measured frequency is provided to an AVR controller 470.

The AVR controller 470 generates a regulation signal that is sent to the automatic voltage regulator 410. The regulation signal indicates whether the output voltage of the electrical generator 420 should be increased or decreased. In some examples, the AVR controller 470 is a proportional-integral controller. Based on the difference between the frequency measurement provided by the output measurement unit 460 and a reference frequency, the regulation signal is adjusted. The regulation signal in turn is input to the automatic voltage regulator 410, which has a number of additional inputs, including a desired nominal reference voltage $V_{REF}$, the output voltage at the output of the electrical generator 420, the voltage at the exciter armature $V_C$, as well as the regulation signal generated by the AVR controller 470. In some examples, the automatic voltage regulator 410 and the AVR controller 470 are implemented with a micro-controller coupled to memory. In other examples, the AVR controller 470 is a separate component that is coupled to the automatic voltage regulator 410 via a communications interface.

In some examples of the disclosed technology, AVRs such as the AVR controller 470 depicted in FIG. 4 can be adapted to improve dynamic stability of power grids and microgrids, including resiliency-based microgrids. In some examples, this allows for microgrids having lower inertia and/or at lower total generation capacity, thereby allowing for reduced costs in maintaining generation resources.

In some examples, including the systems of FIGS. 3 and 4, the CVR effect is utilized by adapting an AVR of the power source to adjust its output voltage during transient events in order to reduce the power consumption of end-use loads. For example, output properties of a generation source can be dynamically monitored so that the output of the corresponding generator can be adjusted accordingly. In some examples, a reference voltage for an AVR is compared to a sensed output voltage. Field excitation of the generator is adjusted in order to drive the difference between the reference voltage and the sensed voltage to zero. In some examples of the disclosed technology, the frequency of the power grid is measured at the output terminals of an AVR with reference to a nominal reference value (e.g., 60 Hz in North America or 50 Hz in Europe) and output voltage of the generator is adjusted accordingly. For example, when measured grid frequency decreases below a nominal frequency, the terminal output voltage is reduced, thereby reducing system load. In some examples, the CVR effect can be utilized by sending a regulation signal to the AVR 410 of coupled to the electrical generator 420 (e.g., a diesel generator) to adjust voltage during a power transient events, thereby reducing the power consumption of end-use loads. Typically, an AVR compares a reference voltage to a sensed voltage and adjusts the field excitation of the generators to drive the difference to zero.

VI. Example Control System Diagram

Figure 5:
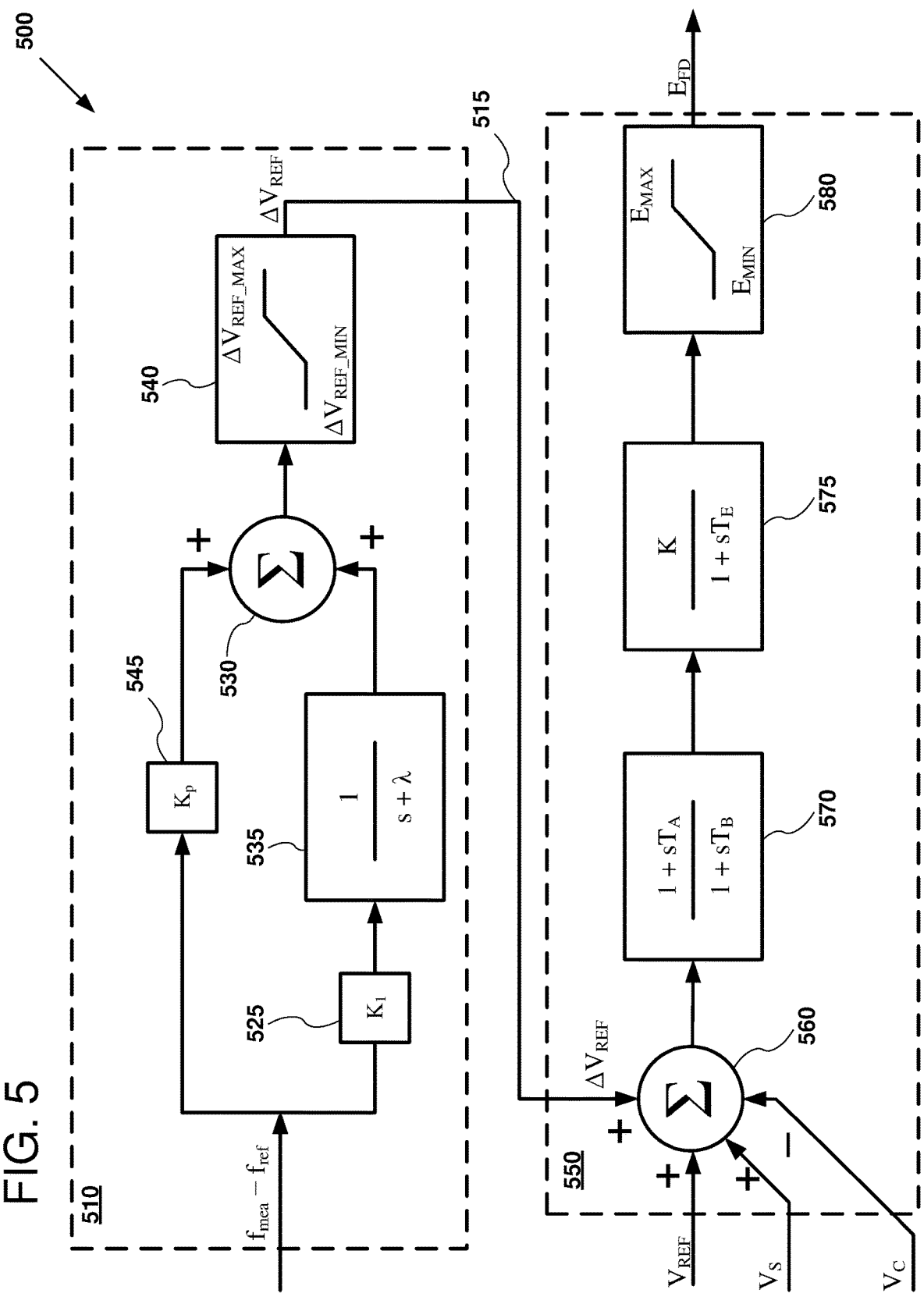
FIG. 5 is a system diagram of the controller that can be used to regulate power sources, as can be implemented in certain examples of the disclosed technology.

FIG. 5 is a control system diagram 500 of a modified controller that can be used to control an electrical generator or other power source in certain examples of the disclosed technology. The controller includes a first portion 510 that generates a regulation signal 515 that is sent to a second portion 550 of the controller. The second portion 550 sums a number of reference voltages and generates an exciter field current, which can, for example, be sent to an exciter field in electrical generator.

As shown in FIG. 5, a difference between a first measured frequency ($f_{MEA}$) and a reference (or desired) frequency ($f_{REF}$) is input to the first portion 510 of the controller. In other examples, other electrical characteristics of the power grid may be input to the first portion 510, for example a calculated difference in frequency from another module, current, conductance or resistance in a measurement component, or other suitable electrical parameter. The frequency difference is multiplied by two different constants. The frequency difference is multiplied 545 by a proportional constant $K_P$, and sent to a summing node 530. The frequency difference is also integrated 525 using an integral constant $K_I$ and a decay parameter 535 is applied to the integrated frequency difference. The output of the proportional calculation and the integral portion with decay parameter applied are summed at the summing node 530. In some examples, a proportional-integral controller such as that depicted in FIG. 5 does not include a decay portion (or a decay parameter of zero). The summed values are then sent to a range-limiting portion 540, where the calculated voltage from the summing node 530 is clamped to be between the values $\Delta V_{REFMIN}$ and $\Delta V_{REFMAX}$. The resulting $\Delta V_{REF}$ value is used to generate the regulation signal 515 that is sent to the second portion 550 of the controller.

The second portion 550 sums the $\Delta V_{REF}$ value generated by the first portion 510 and received as regulation signal 515 with a number of additional voltages, including a reference voltage $V_{REF}$, which is a target voltage for the output of an electrical generator to which the controller is connected, a measured output voltage of the generator, and the measured voltage at the output of an exciter armature. As will be readily understood to one of ordinary skill in the art having the benefit of the present disclosure, the voltage values being input to the second portion for summing can vary depending on the particular application. For example, different voltage values in an electrical generator, or different voltage values in other types of power sources can be used to generate the summed value.

When the controller is placed in operation with an associated electrical generator, operation of the controller will proceed as follows. In the event of increase in load, the associated frequency drop will result in a negative input signal (frequency difference) to the controller. Consequently, the regulation signal (output of the controller $\Delta V_{REF}$) will be a negative change in voltage set-point that reduces the end-use load, and thus the electrical torque on DERs.

Table 1 describes a number of parameters associated with the controller of FIG. 5, along with typical ranges of values for the parameters, units, and a brief description of what the value or parameter represents.

TABLE 1

| Name | Range | Units | Description |
|---|---|---|---|
| $f_{mea}$ | — | Hz | Measure frequency |
| $f_{ref}$ | — | Hz | Reference frequency |
| $K_I$ | — | — | Integral gain |
| $K_p$ | — | — | Proportional gain |
| $\lambda$ | — | Second$^{-1}$ | Decay rate |

TABLE 1-continued

| Name | Range | Units | Description |
|---|---|---|---|
| $\Delta V_{REF\_MAX}$ | — | |V| | Limiter |
| $\Delta V_{REF\_MIN}$ | — | |V| | Limiter |
| $V_{REF}$ | — | |V| | Desired voltage |
| $V_S$ | — | |V| | Terminal voltage |
| $V_C$ | — | |V| | Bias voltage |
| $T_A$ | $0.05 < T_A/T_B < 1$ | Seconds | Gain |
| $T_B$ | $5 < T_B < 20$ | Seconds | Time constant |
| K | $20 < K < 100$ $5 < K * T_A/T_B < 15$ | PU | Gain |
| $T_E$ | $0 < T_F < 0.5$ | Seconds | Time constant |
| $E_{MAX}$ | $3 < E_{MAX} < 6$ | PU | Limiter |
| $E_{MIN}$ | $E_{MIN} = 0$ | PU | Limiter |

In a typical proportion-integral (PI) control system the integration of the error signal affects the steady-state operation point after the error signal is driven to zero. Since it is possible that the AVR will drive voltages to levels that are not acceptable for a steady-state condition, the controller should act to return the output voltage to nominal as the frequency of the grid returns to nominal.

An exponential decay is introduced, k, in the integration block of the controller to reduce the integrated error over time, such that the output voltage returns to nominal after the frequency returns to nominal. The exponential decay will reduce or increase voltage in response to a negative or positive frequency deviation, respectively, and then return to its original value when the frequency deviation is eliminated. This can provide additional flexibility in configuring the controller, as an extra degree of freedom is introduced. This allows the controller to be programmed to give priority to reducing the rise time of either the voltage or the frequency deviation, by controlling the decay rate.

A number of different parameters for the first portion 510 of the controller can be selected and tuned to adjust operation of the controller, including the values of $K_P$, $K_I$, $\lambda$, $\Delta V_{REFMIN}$, and $\Delta V_{REFMAX}$, as will be further described below. The first portion 510 of the controller has a proportional gain constant $K_P$ and integral gain constant $K_I$ that are desirably set to provide fast response to frequency changes in the system. The operation of the controller can be tuned by adjusting the values of these constants. In some examples, a derivative portion (e.g., adding a derivative gain constant $K_D$) can be used. However, in some examples, it is observed that derivative control, which may be beneficial to dampen oscillations created by the integral control, does not substantially improve operation of the controller. One set of parameters, as can be used with a SEXS AVR controller adapted according to the disclosed technology, is shown above in Table 1.

The dynamic representations of microgrids are complex enough that most dynamic control systems are not model-based. As a result, the control parameters for the controller of FIG. 5 may not be based on an analysis of the poles and zeros of the system. Thus, as will be readily understood to one of ordinary skill in the art having the benefit of the present disclosure, in the absence of a system model, the gains of the PI controller can be tuned using, for example, either the Ziegler-Nichols and Cohen-Coon methods. In other examples, heuristic optimization, stochastic optimization, genetic algorithms, or other suitable automated techniques can be used to select one or more control parameters for controller operation. In other examples, manual tuning can also be adopted (for example, in cases where other methods fail to produce useable values). While performance of the operations for the controller are depicted as a series of calculations in a control system, as will be readily understood to one of ordinary skill in the art having the benefit of the present disclosure, other limitations can be used. For example, one or more lookup tables (LUTs) can be used to input operational values such as measured frequency or voltages and in turn used to look up one or more intermediate or final values output by the controller.

Turning to the second portion 550 of the controller depicted in FIG. 5, the $\Delta V_{REF}$ value generated by the first portion 510 of the controller is added to a number of additional reference voltage values. In the illustrative example, a reference voltage $V_{REF}$, which represents the nominal voltage of the attached load, the output terminal voltage $V_S$, and the exciter armature output voltage $V_C$ are added together in a summation operation 560. The summed voltage values are in turn sent to two gain components 570 and 575, which amplify the voltage according to values described above regarding Table 1, including $T_A$, $T_B$, $T_E$, and K. The amplified value is then sent to a clamping function 580 to clamp the exciter field current value between $E_{MAX}$ and $E_{MIN}$. The second portion 550 of the controller thus outputs a value $E_{FD}$, which corresponds to a current to be applied to the exciter field (e.g., the exciter field 430 in the generator 420 discussed above regarding FIG. 4).

Figure 6:
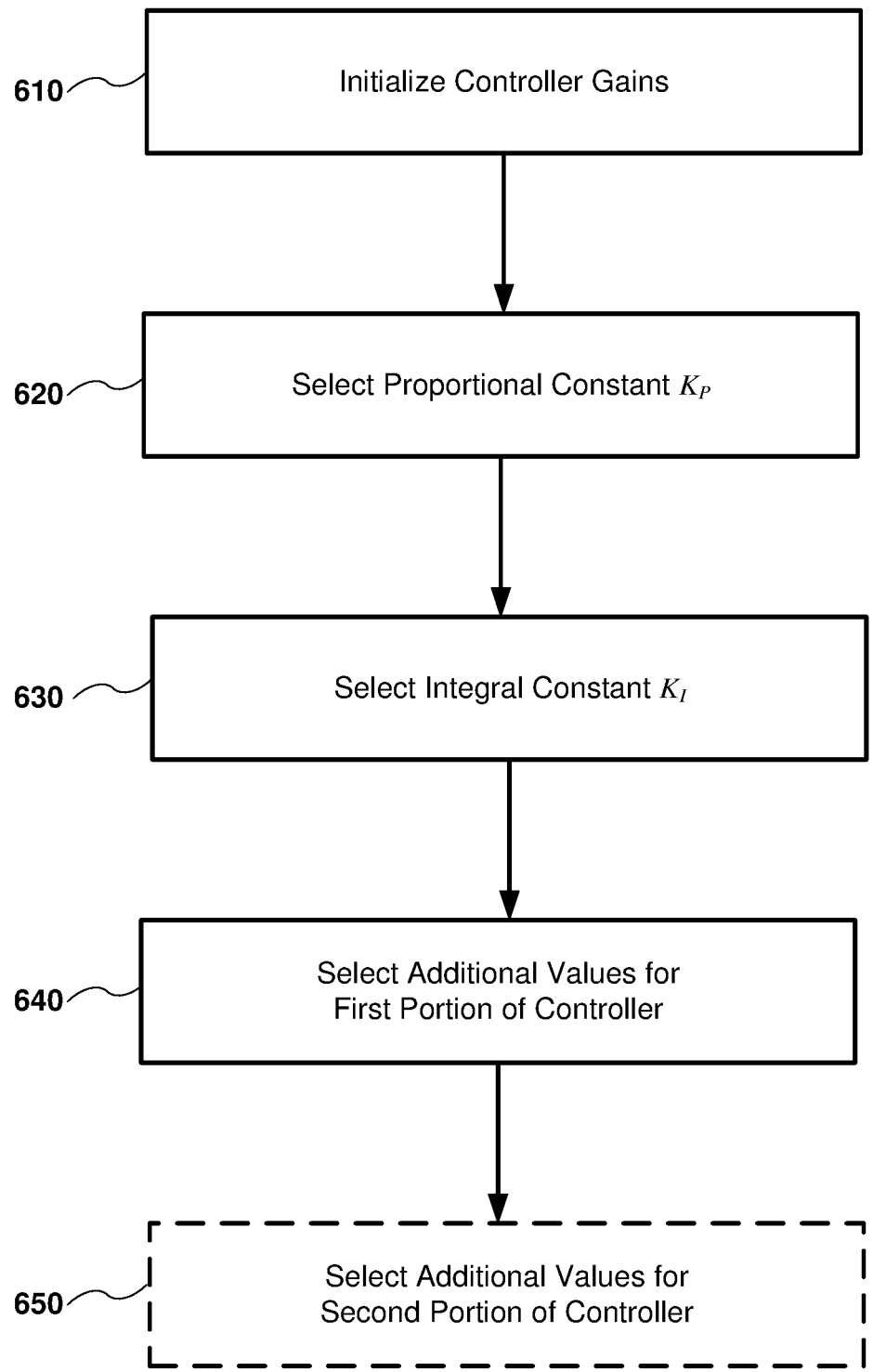
FIG. 6 it is a flow chart outlining a method of selecting parameters for a controller implemented according to certain examples of the disclosed technology.

VII. Example Method of Selecting Parameter Values to Configure Controller Response FIG. 6 is a flowchart 600 that outlines an example method of selecting parameter values for configuring a controller, such as can be performed in certain examples of the disclosed technology. For example, the illustrated method can be used to configure controllers used with the regulators discussed above regarding FIGS. 3-5.

At process block 610, parameter values such as amplifier gains used in a control system are initializing. For example, the parameter values can be initialized by introducing a step disturbance in a simulation of the controller system and observing the frequency and voltage responses that result. In some examples, the Cohen-Coon method is used to calculate initial gains used for one or more components of the control system. For example, constants $K_P$ and constants $K_I$ for the example controller system of FIG. 5 can be initialized using such a method. In other examples, other techniques such as Ziegler-Nichols can be employed.

In some examples, a tuning process according to Cohen-Coon methodology applies a step input to the system and various measurements are taken from the response observed for calculating the gains for the controller. The step input is provided by changing the voltage set-point of the exciter, $\Delta V$, and measuring the associated frequency deviation, $\Delta f$. The proportional gain $g_p$ is calculated as shown in Eqn. (1).

$$g_p = \frac{\Delta f}{\Delta V} \quad (1)$$

Figure 7:
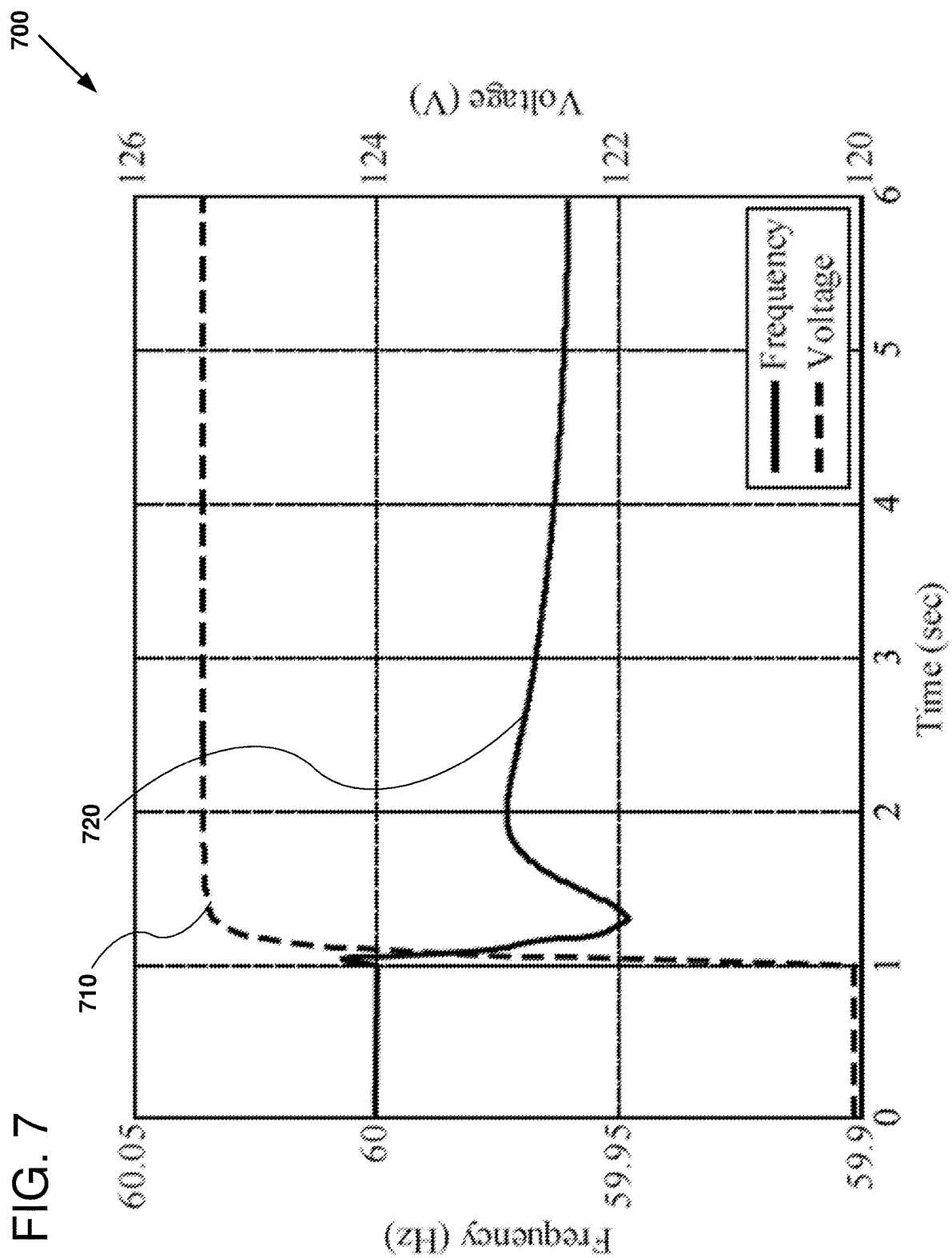
FIG. 7 is a chart showing the frequency response at the output of an electrical generator responsive to a controller implemented according to certain examples of the disclosed technology.

An example of the calculation of the process gain according to Eqn. (1) is shown in a chart 700 of FIG. 7. As shown, the generator nominal output voltage 710 is set to 120 V RMS and the frequency response 720 of the system is measured. From FIG. 7 it is possible to determine the value of $\Delta f$ and $\Delta V$, as 0.04 Hz and 5.0 V respectively.

Once the values of $\Delta f$ and $\Delta V$ are calculated, the values of the dead time, $t_d$, and the time constant, $\tau$ are determined. The value of $t_d$ is calculated from the time difference between the time of change in voltage setting and the intersection of the tangential line to maximum slope of frequency change and the original value of frequency on the time axis. The value τ is determined from the time difference between the end of the dead time and the time at which frequency reaches 63% of its total change.

After the initial gains have been selected, the method proceeds to process blocks 620 and 630 to determine the proportional-integral gains $K_P$ and $K_I$. Using the values of $g_p$, $t_d$, and τ, generated at process block 610 it is possible to calculate the PI gains, $K_P$ and $K_I$, as shown in Eqns. (2) and (3):

$$K_P = \frac{0.9}{g_p}\left(\frac{\tau}{t_d} + 0.092\right) \quad (2)$$

$$K_1 = \frac{k_p}{3.33 t_d}\left(\frac{\tau + 2.22 t_d}{t_d + 0.092 t_d}\right) \quad (3)$$

Process block 620, a proportional constant $K_P$ is selected. For example, the proportional constant can be selected by increasing the gain of the proportional component and observing frequency response of a simulated system in response to a disturbance, for example a transient response on the electrical grid. The value for the proportional constant is increased until doing so does not cause oscillations in the frequency response of the system.

At process block 630, an integral constant $K_I$ is selected. For example, the integral constant can be selected by increasing the gain of the integral component to reduce rise time of the regulation signal $V_{REF}$ to reduce or eliminate steady state error. However, it should be noted that increasing values of integral gain can cause overshoots and degrade overall stability of a system controlled by the controller. Thus, it is desirable to set the integral gain constant to balance reduce rise time, reduced steady state error, avoidance of voltage overshooting, and decrease stability of the system.

At process block 640, additional values for the controller (e.g., additional values for the first portion 510 of the controller of FIG. 5) can be selected. For example, magnitude of the delay parameter λ can be increased and the corresponding voltage response observed. For example, for larger values of λ, the voltage response of the associated generator should return back to the nominal value faster after the frequency of the attached load settles back to a nominal value. However, for increasingly larger values of λ, instabilities in control or operation may occur, as the higher value of λ increases the rate at which the voltage increases. Thus, selection of the value of λ is based in part on operational requirements of a particular grid system in which the controller and its associated generator are deployed. As another example, the values of $\Delta V_{REFMIN}$ and $\Delta V_{REFMAX}$ can be selected according to a desired voltage response. In some examples, the values are selected not just based on desired voltage response of the associated generator, but also taking into account other considerations, for example response, performance, or other operating parameters of the associated generator. The larger the allowed deviation of $\Delta V_{REF}$ (between $\Delta V_{REFMIN}$ and $\Delta V_{REFMAX}$), the greater the reduction in end-use load, and thus more mitigation of a frequency transient may be possible. However, increasing the minimum and maximum ranges of allowed $\Delta V_{REF}$ values can cause the system to exceed service voltage specifications. In some examples, the delay parameter λ, can be omitted altogether. However, this may require manually resetting the voltage after a frequency deviation event.

At process block 650, additional values for the controller can be selected, for example, values for the second portion 550 of the controller discussed above regarding FIG. 5. In some examples, the second portion of the controller may be an off-the-shelf automatic voltage regulator (AVR), and thus selection of parameters for operation of the second portion may not be easy, if at all possible, to perform. However in other examples, such as where the second portion of the controller may be user programmable, or in examples where both the first portion 510 and the second portion 550 of the controller system outlined in the FIG. 5 are implemented together, then one or more parameters of the system may be configurable by, for example, the manufacturer of the controller, or by an authorized user in the field. Examples of parameters that can be configured for the second portion include, but are not limited to, which voltage values to be summed in the second portion of the controller, individual gains associated with incoming voltage input values, time constants, gain constants, maximum and minimum values for the excitation field current, or other suitable parameters.

Example methods of selecting parameter values to configure controller response disclosed herein typically exhibit the following properties and trade-offs. Increasing the integral gain $K_I$ generally reduces rise time of frequency response, increases rise time of voltage response, and reduces system stability. Thus, continuous increase in the integral gain can, at some point, cause oscillations in the system response, which may be undesirable and certain applications. Increasing the integral gain $K_P$ generally reduces rise time of the voltage response. Increasing decay rate λ generally reduces rise time of the voltage response. Thus, increasing the decay rate can determine how quickly the generator output voltage returns to nominal after a transient event. Further, increasing the range of magnitude of voltage change ($\Delta V_{REFMAX}$–$\Delta V_{REFMIN}$) that can be introduced by the controller and associated regulator can increase the flexibility of the controller and reduce the frequency rise time, or decrease the amount of frequency deviation in the associated load. Similarly, decreasing the parameters discussed above generally tends to reduce the effects described.

VIII. Example Method of Using a Controller Coupled to an AVR

Figure 8:
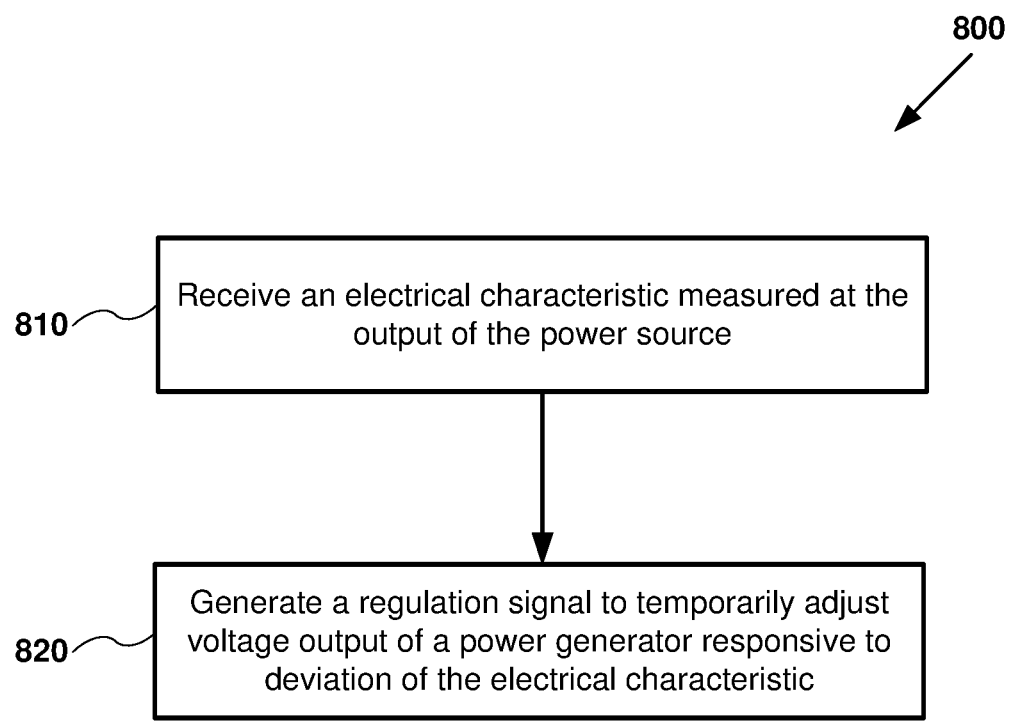
FIG. 8 is a flow chart outlining an example method of generating a regulation signal for a power generator, as can be performed in certain examples of the disclosed technology.

FIG. 8 is a flow chart 800 outlining an example method of using a controller coupled to an automatic voltage regulator, as can be performed in certain examples of the disclosed technology. For example, controllers, AVRs, and power generators such as those described above regarding FIGS. 3, 4, and 5 can be used to perform the illustrative method.

At process block 810, an electrical characteristic measured at the output of the power source is received. For example, the electrical characteristic can be a measured AC frequency or a difference in a measured AC frequency of a power grid to which a power generator is coupled to provide power. In some examples, the electrical characteristic's frequency, and the frequency is measured by averaging two or more voltage measurements, by counting voltage peaks, by counting voltage troughs, or by counting a number of times a voltage crosses a predetermined value.

At process block 820, a regulation signal is generated to temporarily adjust voltage output of a power generator responsive to deviation of the electrical characteristic received at process block 810. In some examples, the regulation signal is selected to adjust voltage output of the power generator so as to reduce deviation measured for the at least one electrical characteristic. In some examples, the regulation the signal is selected to cause a receiving power generator to reduce its output voltage when the frequency is less than a nominal value. In some examples, the regulation signal selected to cause receiving power generator to increase its output voltage when the frequency is greater than a nominal value.

IX. Example Method of Operating a Controller Coupled to an Electrical Generator

Figure 9:
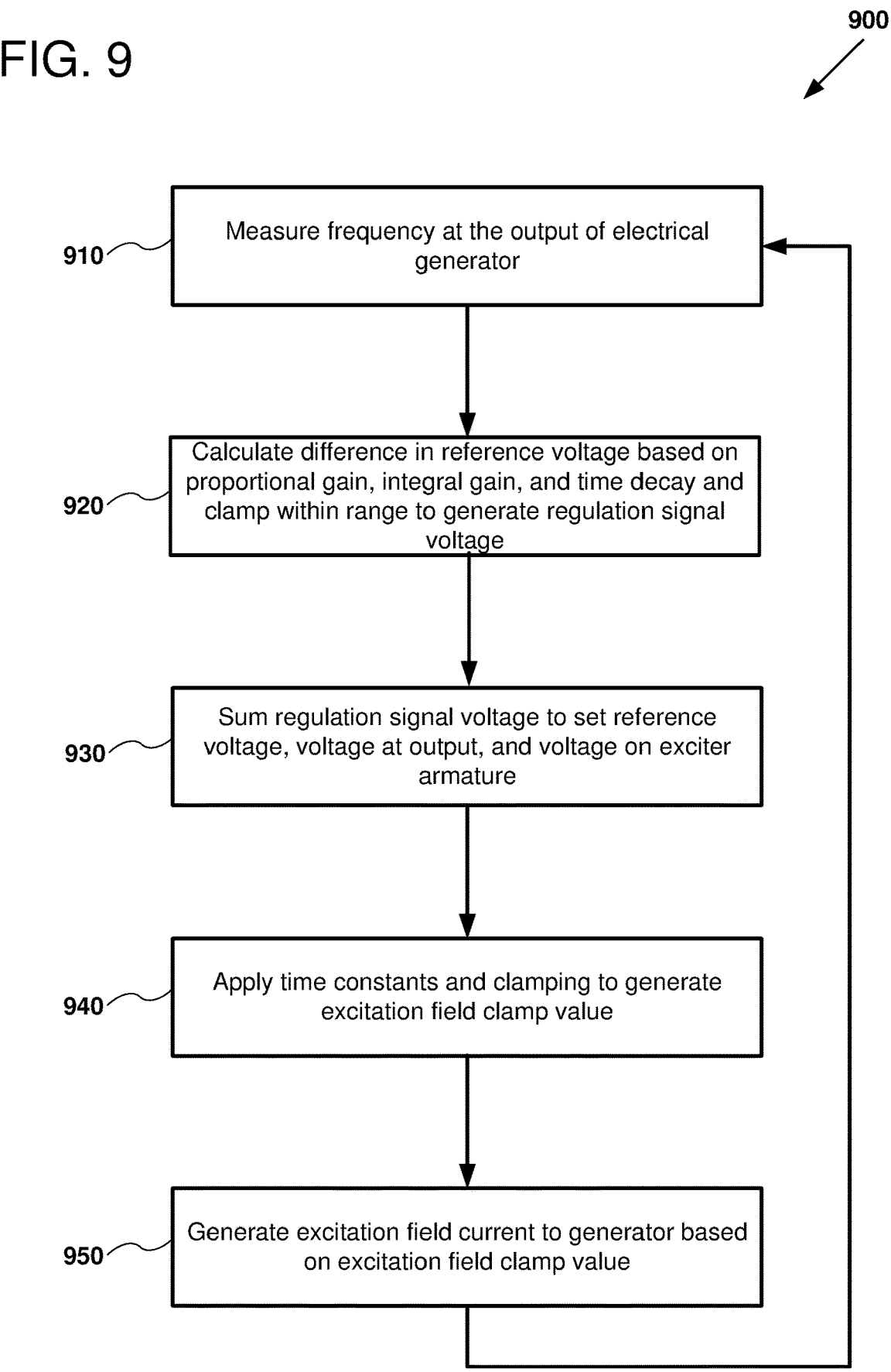
FIG. 9 is a flow chart outlining an example method of operating a controller with an electrical generator, as can be performed in certain examples of the disclosed technology.

FIG. 9 is a flow chart 900 outlining an example method of operating a controller with an electrical generator, as can be performed in certain examples of the disclosed technology. For example, the controllers discussed above regarding FIGS. 3, 4, and 5 can be used to implement the illustrated method.

At process block 910, frequency is measured at the output of an electrical generator. For example, an analog-to-digital converter can be used to sample voltages and generate a measured frequency for the power grid at the generator. As discussed above, other suitable methods can be used to measure the frequency.

At process block 920, a difference is calculated in reference voltage $V_{REF}$ based on configured parameters for the controller, including but not limited to, proportional gain, integral gain, and time decay. The reference voltage difference is clamped within a range selected to allow for adequate response and support for the grid. A regulation signal is generated based on the clamped reference voltage and the signal is sent to an AVR.

At process block 930, the clamped reference voltage generated at process block 920 is added to a predetermined set reference voltage, voltage measured at the output of the electrical generator, and voltage measured on an exciter armature of the electrical generator. In some examples, one or more of the described voltages may be omitted, or additional voltage settings may be included in the summation.

At process block 940, one or more time constants are applied to the summed voltage and the result is clamped to generate an excitation field clamped value.

At process block 950, excitation field current is generated in the generator based on the excitation field clamped value generated at process block 940. As operation of the generator continues, frequency measured at the output of the electrical generator can be performed again, along with the additional actions of generating the regulation signal and generating an excitation field current for further adjusting operation of the electrical generator. In some examples, such a cycle of measuring the frequency and adjusting excitation field current of the generator can occur in a tight scale in a time scale on the order of 10 seconds. In some examples, such a cycle can occur on a time scale on the order of one second. In some examples, such a cycle can occur on a time scale on the order of tens or hundreds of milliseconds.

X. Example Method of Provisioning Power Sources

Figure 10:
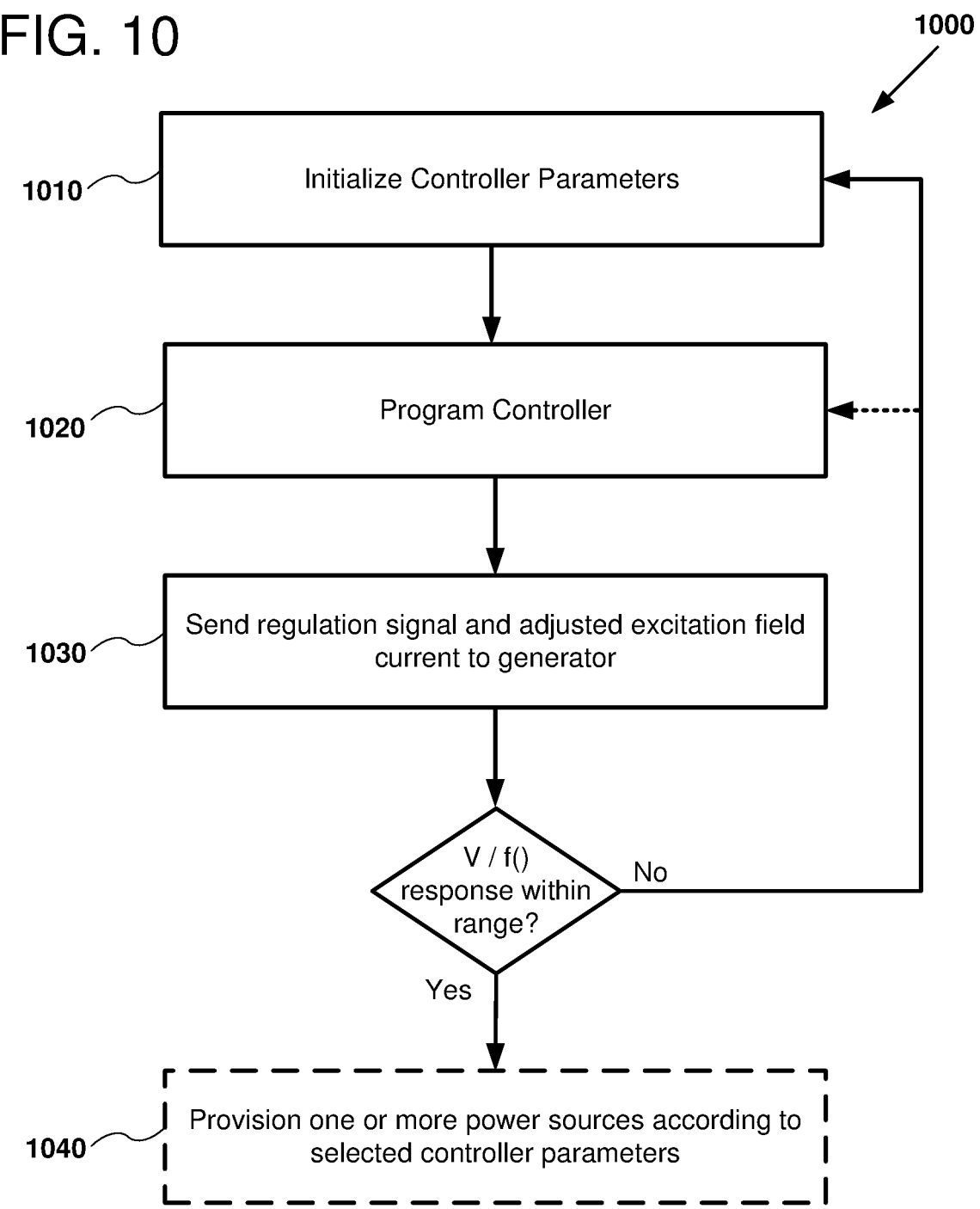
FIG. 10 as a flow chart outlining an example method of programming a microcontroller and provisioning one or more power sources, as can be performed in certain examples of the disclosed technology.

FIG. 10 as a flow chart 1000 outlining an example method of programming a microcontroller and provisioning one or more power sources, as can be performed in certain examples of the disclosed technology. For example, the controller and generators discussed above regarding FIGS. 3, 4, and 5 can be used to implement the illustrated method. In some examples, inverter-connected power sources, such as batteries and photovoltaic sources can be used as one or more of the power sources.

At process block 1010, parameters for a controller are initialized, and one or more parameters for a controller are determined. In some examples, at least one of the parameters is determined using a simulation of a grid environment coupled to a power source. In other examples, the parameters can be initialized on a controller couple to a power source located in the field.

At process block 1020, a controller is programmed according to the parameters determined at process block 1010. For example, the parameters can be programmed into a computer readable storage device, stored in a memory, including volatile or non-volatile memory, accessed via a wired or wireless computer network, or by using other suitable means of programming a processor, microcontroller, programmable logic, or other suitable controller implementation hardware. In some examples, a virtual controller is programmed for use with a simulation of an electrical grid.

Process block 1030, a regulation signal is generated and sent in order to generate an adjusted excitation field current for a generator. Examples that use inverter-connected power sources, such as batteries or photovoltaics adjust energy output of during a period of time when responding to a transient grid event. In some examples, the regulation signal and/or adjusted excitation field current are adjusted for physical components installed in the field. In other examples, these signals are at first performed in a virtual environment, to determine one or more parameter values for a controller, before deployment in the field. An analysis can be performed on output voltage and/or frequency response at the generator, or at other portions of the coupled electric grid, to determine whether grid performance is acceptable. For example, parameters such as decay, time constants, proportional gain, integral gain, or other suitable parameters can be adjusted based on observed voltage or frequency response. If the observed responses are determined to be within range, the method proceeds to process block 1040. If the response is determined to not be within an acceptable range, the method proceeds to process block 1010 or 1020, in order to adjust controller parameters, and/or to reprogram the controller, in order to tune operation of the power source's to the environment. In some examples, the response is determined within a virtual simulation environment, while in other examples, the response is measured at the power source in the field.

At process block 1040, one or more power sources are provisioned according to the selected control parameters. For example, if voltage and/or frequency response is determined to be within an acceptable or desirable range, then the selected control parameters are chosen for programming the controller. Then, the grid can be further simulated and/or operated to determine a minimum desired capacity for the associated power source. For instance, this may allow for a smaller capacity generator or power source to be used, thereby taking advantage of the improved response of the generator when coupled to a controller that is programmed according to the acts discussed above regarding process blocks 1010, 1020, and/or 1030.

XI. Experimental Results

This section discusses experimental simulation results of dynamic simulations conducted using the tuning methods discussed above regarding FIG. 6. This section also examines multiple example simulations with a microgrid based on the IEEE 123 Node Test System, and an evaluation of simulation results.

Figure 11:
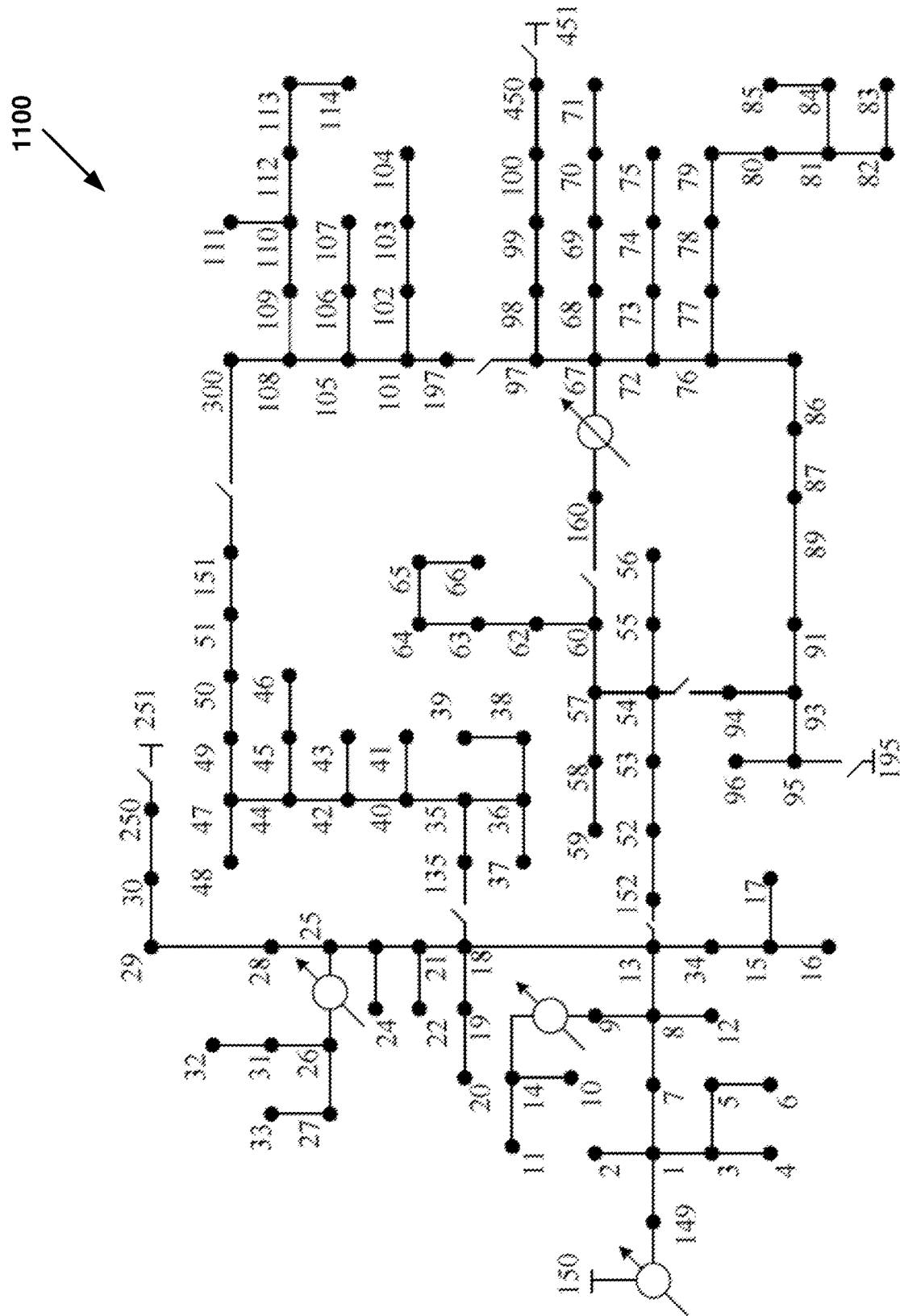
FIG. 11 is a diagram of an example IEEE (Institute of Electrical and Electronics Engineers) model of an electrical grid, as can be used in certain examples of the disclosed technology.

For these simulations, a modified version of the IEEE 123 Node Test System was used. The IEEE 123 Node Test System is used as a microgrid, although any other suitable test system can be used. The microgrid version of the test system has a combination of diesel generators and inverter-connected photovoltaic sources. The inverters modeled are compliant with IEEE STD 1547a-2014. FIG. 11 is a one-line diagram of an IEEE 123-node test system microgrid 1100 that was used to generate the experimental results discussed in this section. FIGS. 12-15 are charts illustrating responses observed in the experimental cases discussed below.

The test system was modified through the addition of radial secondary service drops and the inclusion of distributed energy resources (DERs). Table 2 lists characteristics associated with DERs connected to the system for the experimental simulations. For each of the generation sources, Table 2 indicates the node it is connected to, the generator type, the rated apparent power, and the controller type. From Table 2 it can be seen that both of the diesel generators use a GGOV1 type speed control governor model and SEXS-type automatic voltage regulators. The photovoltaic sources uses a proportional integral-derivative (PID) type controller that operates to maintain a constant power factor output to maximize the energy output of the available solar radiation.

TABLE 2

| Generator (#) | Node (#) | Generator Type | Rating (kVA) | Controller type |
|---|---|---|---|---|
| G1 | 150 | Diesel | 2,500 | GGOV1 and SEXS |
| G2 | 60 | Diesel | 1,500 | GGOV1 and SEXS |
| G3 | 18 | PV | 2,500 | PID |

Experimental Case 1: IEEE 123 Base Case w/2,500 kVA G1

In Experimental Case 1 ("base case"), the initial system loading is 5,000 kW and 1,050 kVAr; this includes loads and losses. The two rotating machines, generators G1 and G2, produce 2,711 kVA of apparent power and 2,500 kW is supplied by generator G3; G3 does not produce any reactive power. Typical of modern diesel generators, generators G1 and G2 have relatively low inertias, H=0.5, with high-speed, PID type controls.

Figure 12:
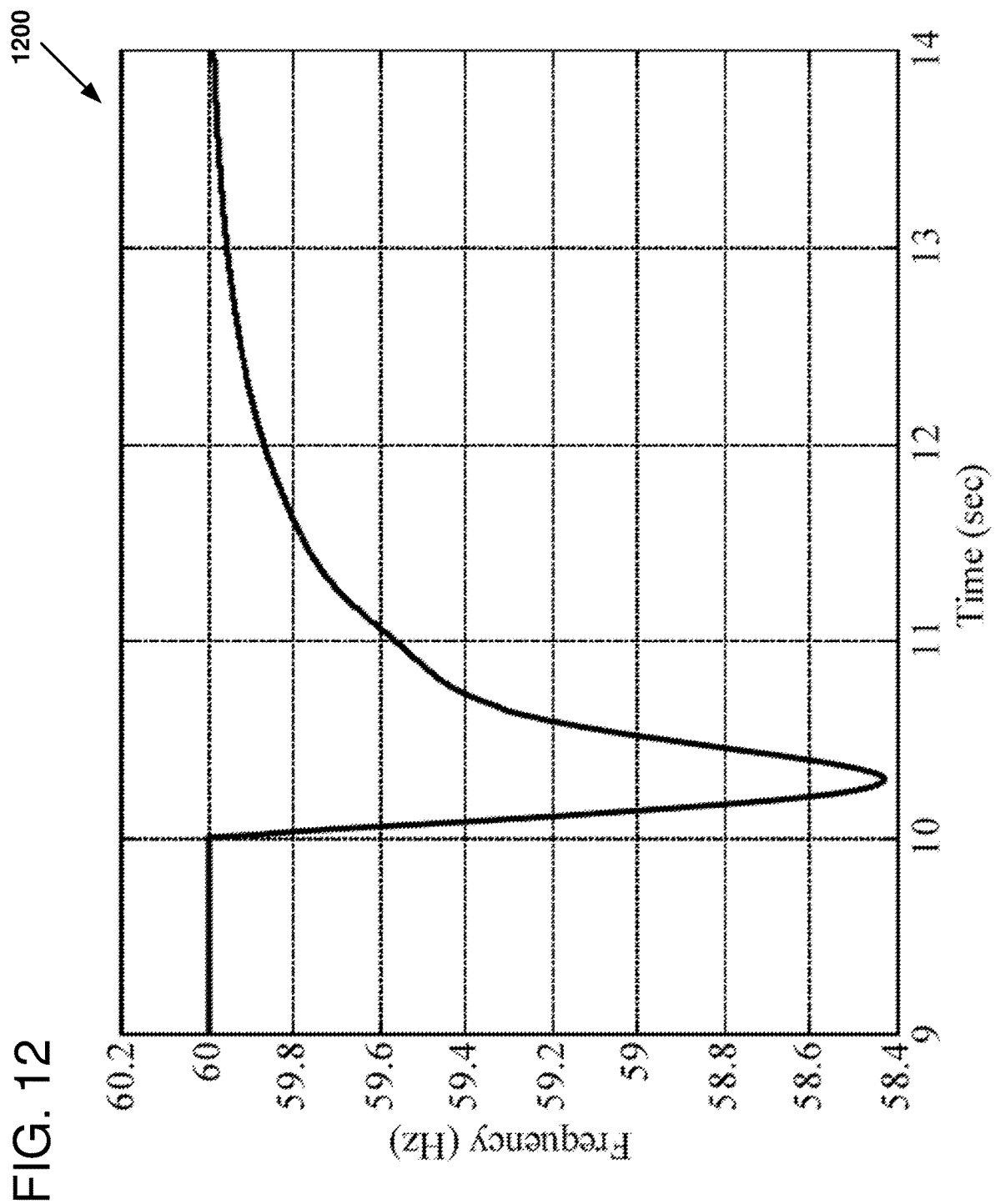
FIG. 12 is a chart of system frequency during a step increase in load, as can be observed in certain examples of the disclosed technology.

FIG. 12 is a plot 1200 showing change in measured grid frequency when a transient occurs in a micro-grid system coupled to an electrical generator under direction of the controller implemented according to certain examples of the disclosed technology. A transient occurs when a 950 kVA step increase in load occurs on the islanded microgrid 1100 of FIG. 11. With the inverters outputting at a constant power factor, and the second diesel generator operating in a scheduled output mode, the step increase in load must be handled solely by generator G1.

While the frequency transient shown in FIG. 12 does not exceed the default limits of IEEE STD 1547A, a larger transient could result in the frequency being >59.5 Hz for >2.0 seconds. For a larger transient, if the inverter of generator G3 were IEEE STD 1547-A compliant, it would disconnect, which could lead to a system collapse due to load exceeding the combined capacity of generators G1 and G2, assuming no additional control actions are taken. As discussed above, one option to reduce the magnitude of the frequency transient during a load increase is to increase the size of the rotating machine generators.

Experimental Case 2: Oversizing Generator

Figure 13:
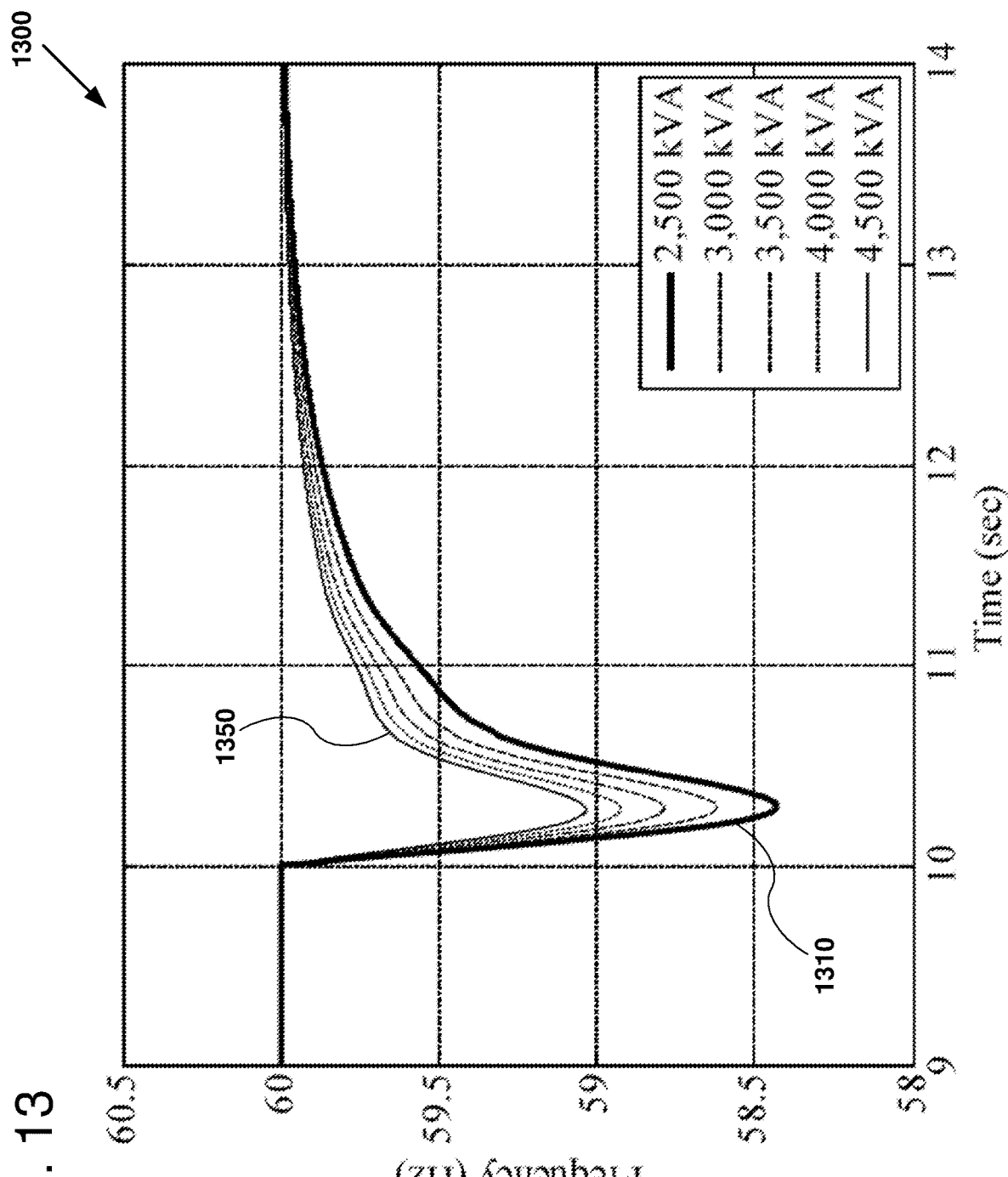
FIG. 13 is a chart showing a frequency transient plot with multiple generator sizes, as can be observed in certain examples of the disclosed technology.

As was discussed above, increasing the amount of rotating inertia will affect the size of the frequency transient, but this can typically only be done when generators are being installed in a power delivery system. FIG. 13 is a chart 1300 plotting the frequency response of the example experimental system while varying the capacity of generator G1. The plots in the chart 1300 show the same load increase as used in Experimental Case 1, with the size of G1 varying in nameplate capacity from 2,500 kVA to 4,500 KVA. The size and load of generators G2 and G3 remained unchanged. The respective responses (ranging from a first plot 1310 for 2,500 kVA G1 to a fifth plot 1350 for a 4,500 kVA G1) illustrate that as the size of the generator increases, the deviation in system frequency decreases. Thus, while deploying a larger generator will decrease the size of the transients, there are negative impacts to efficiency, as discussed above.

Experimental Case 3: AVR Control Implemented

In Experimental Case 3, the same step change in load used for Experimental Cases 1 and 2 will be examined. However, Case 3 uses a 2,500 kVA generator G1 having a CVR controller as discussed above regarding FIG. 5. While it is possible to implement the control on all generation units, including inverted generators (e.g., G3), this case will examine only unit G1, for ease of explanation. Prior to the simulations, a tuning process as outlined in FIG. 6 was used to determine the controllers gains—$K_P$=20 and $K_f$=400 were used. Initially, the decay rate λ is set to 100. The maximum range by which the controller 500 adjusts the voltage is also selected (e.g., between $\Delta V_{REFMIN}$ and $\Delta V_{REFMAX}$). The larger the allowable deviation in voltage, the greater the reduction in end-use load, and the more a frequency transient can be mitigated.

Under normal operating conditions Range A of ANSI Standard C84.1 defines that the voltage at the point of interconnection (the service voltage), should be in a range of 114V-126V; this is the so-called desirable range. Range B of the standard allows for a "tolerable" range of 110V-127V. Operating in Range B is not intended to be indefinitely, and utilities typically take actions to correct the condition when it occurs.

The ranges of ANSI C84.1 are often applied to microgrids, but they are typically not a physical limitation of the system. It is technically possible to operate at levels below even Range B for short periods of time. While this would not be a recommended steady-state condition, it would be possible for the AVRs to drive voltage well below ANSI bands for a few seconds if it would prevent the system from collapsing. For example, the voltage limits of the Computer Business Equipment Manufacturers Association (CBEMA) curve could be used. The lower limit of the voltage reduction can be selected by the microgrid operator. However, for experimental results discussed in this section, ANSI C84.1 Range A is used to examine the performance of the presented control system.

Figure 14:
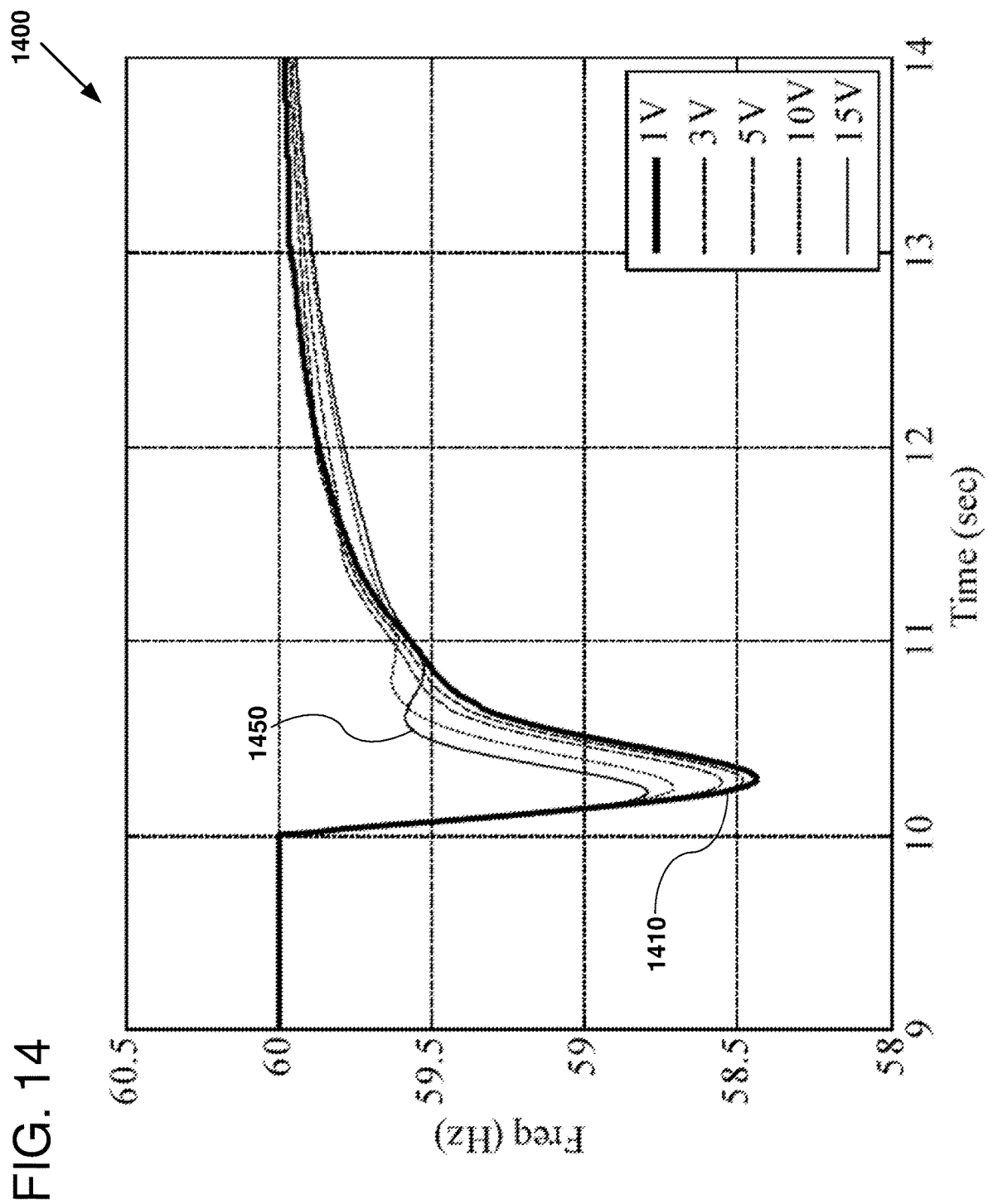
FIG. 14 is a chart showing a frequent transient plot with multiple values of AVREFMIN, as can be observed in certain examples of the disclosed technology.

FIG. 14 is a chart plotting the terminal voltage at the output of generator G1 for a number of different voltage range values. As shown in FIG. 14, the value of $\Delta V_{REFMIN}$ was selected to range between 1 V and 15 V for a number of different transient simulations. Frequency deviation for each of the simulations is plotted in the chart 1400, including a first plot 1410 for a 1 V limit, and fifth plot 1450 for a 15 V limit. As shown, by increasing the range of allowable voltage deviation, the deviation in frequency of the electric grid at the generator can be reduced. Since the plotted voltage is the voltage at the terminals of G1, the voltages at other points of the system are likely to be lower, especially, for example, at the ends of secondary triplex lines. Of particular note in FIG. 14, is that using a 10V range with a controller implemented according to an example the disclosed technology will provide a response similar to using a 3,500 kVA generator without such a controller.

For the traces shown in FIG. 14, the value of decay parameter λ was constant at 100. But by varying the value of the decay parameter λ, it is possible to control how quickly the voltage returns to nominal after the frequency returns to nominal.

Figure 15:
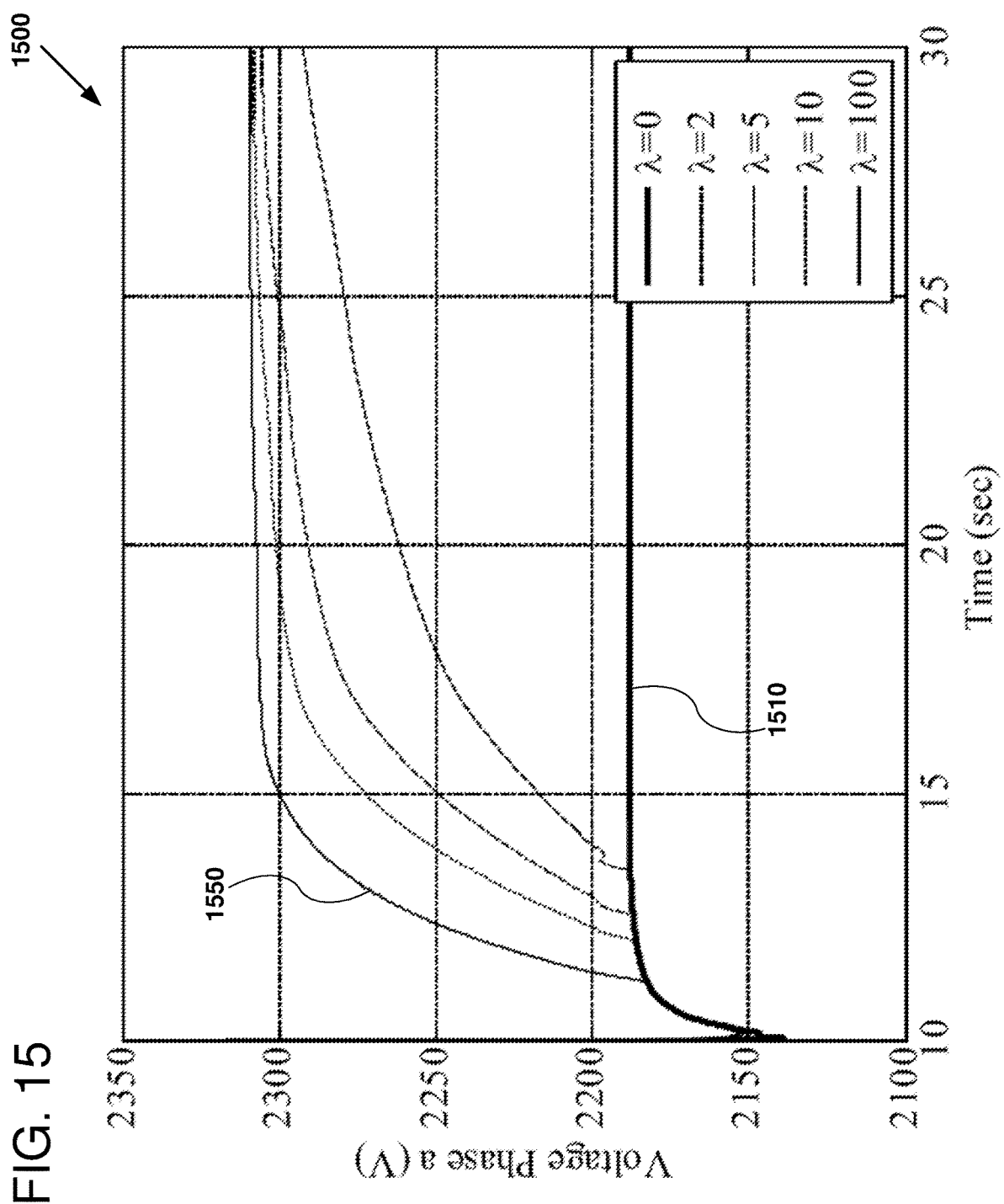
FIG. 15 is a chart showing a voltage restoration for various values of a decay parameter in a controller, as can be observed in certain examples of the disclosed technology.

The plots charted in FIG. 15 show varying change in voltage phased for values of k ranging from 0 to 100, with both of $\Delta V_{REFMIN}$ and $\Delta V_{REFMAX}$ set to ±10 V. A first plot 1510 shows the change in voltage for a decay parameter λ of zero. A fifth plot 1550 shows the change in voltage for a decay parameter λ of 100. As shown in the chart 1500, with a λ value of zero, there is no exponential decay in the integration term, and a persistent voltage bias can be seen. As the value of λ is increased from zero and exponential decay is applied to the integration gain, the voltage returns to nominal. Higher values of λ increase the rate at which the voltage increases, and at high values it can result in instabilities in the controller. Similar to the values of $\Delta V_{REFMIN}$ and $\Delta V_{REFMAX}$, the value of λ can be a user-defined or automatically selected value that is based on the operational requirements of a particular system.

Selecting Size Capacity Values for Generators

As discussed above it, was demonstrated that with selected control gains and limits, it is possible to control the AVR so that a 2,500 kVA generator has an inertial response similar to a 4,000 kVA generator. For the given experimental results, the example the gains and limits were: $K_P$=20, $K_I$=400, λ=100, and $\Delta V_{REFMIN}$ and $\Delta V_{REFMAX}$ set to ±10V. How this technical benefit translates into an economical benefit is discussed below.

Two benefits of a properly-sized generator are reduced capital costs and reduced operations and management (O&M) costs. The capital costs for generators will vary by manufacturer, but an Electric Power Research Institute (EPRI) report cited $371/kW as a cost for capacity in 2002. For the reduction of a 3,500 kVA generator to a 2,500 kVA generator this equates to $556,500 less in capital costs; this assumes only the cost of the generator, and does not account for the shipping and installation costs.

O&M cost are more difficult to calculate because they are dependent on a number of locational factors. To provide an example of the cost, the fuel consumption based on time-series simulation is conducted. Using the fuel efficiency curve of FIG. 2, the difference between a 3,500 kVA generator and 2,500 kVA generator is $13,696; assuming $15.34 per kWh for 200 hours of operation per year with a fuel cost of $1.00/gallon. While this does not account for all O&M costs, it gives a sense of the scale of the benefits of properly sizing generator assets.

The valuations provided in this section are not meant to be comprehensive, but they show how the reduction in the size of installed generation can be translated into direct cost savings.

Experimental Results—Applicability to all Inverter Systems

For entirely inverter-based systems with no rotating machines, there is no rotating inertia so the frequency and voltage are maintained by the ability of the inverters to quickly change their output power. The ability to quickly change the output power, at high power levels, is what differentiates the grid forming inverters of a microgrid from simple PV inverters and also explain why grid forming inverters are much more expensive. In some examples, the disclosed control methods can be used to reduce the maximum rate of power change, thereby reducing inverter costs.

XII. Example Computing Environment

Figure 16:
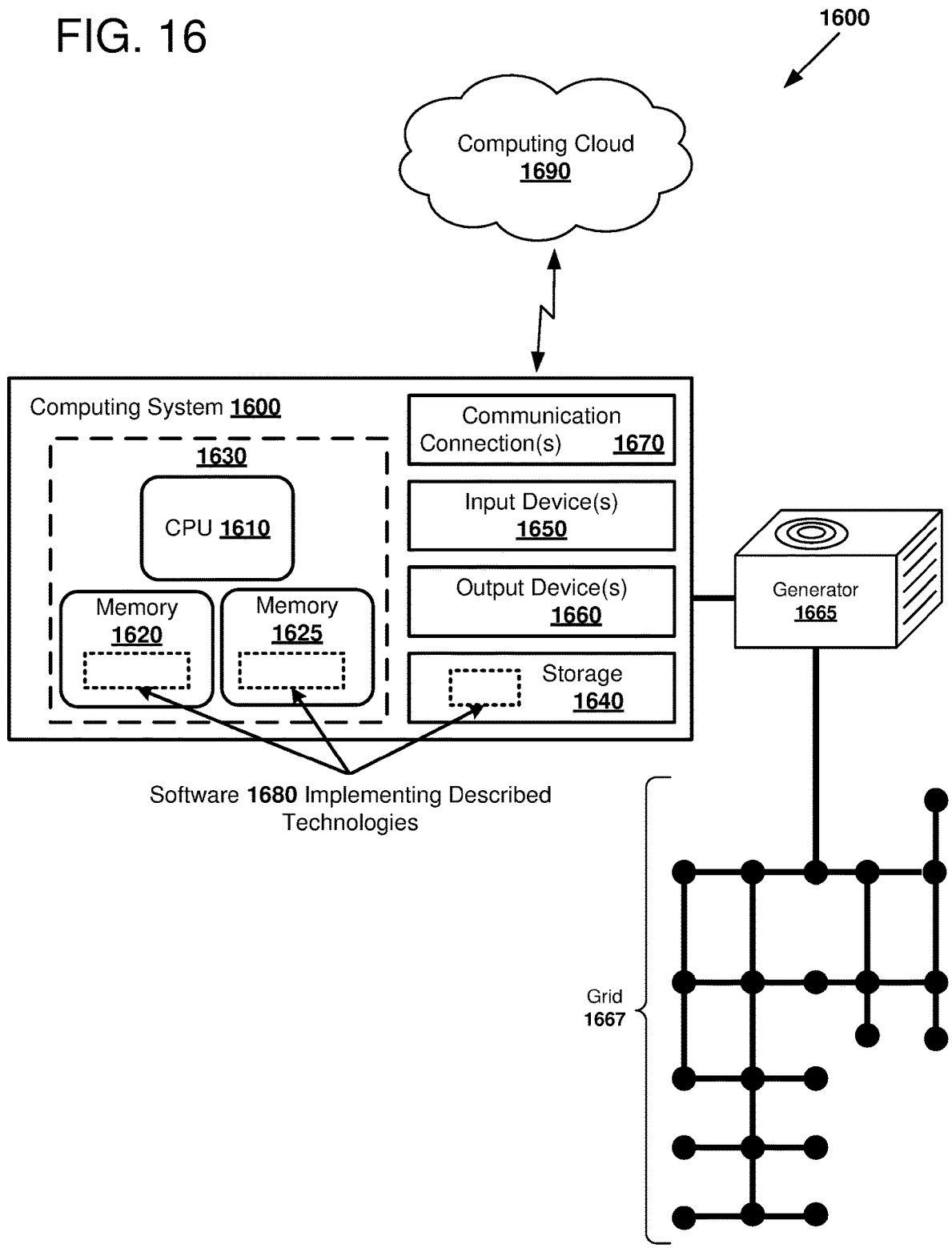
FIG. 16 is a diagram outlining an example computing environment coupled to a generator and power grid, as can be implemented in certain examples of the disclosed technology.

FIG. 16 illustrates a generalized example of a suitable computing environment 1600 in which described embodiments, techniques, and technologies, including determining an energy response, generating and sending bids, and market coordination can be implemented. For example, the computing environment 1600 can be used to implement any of the controllers or AVRs, as described herein.

The computing environment 1600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 16, the computing environment 1600 includes at least one central processing unit 1610 and memory 1620 and 1625. In FIG. 16, this most basic configuration 1630 is included within a dashed line. The central processing unit 1610 executes computer-executable instructions and may be a real or a virtual processor. The central processing unit 1610 can be a general-purpose microprocessor, a microcontroller, or other suitable processor. In a multi-processing system, multiple processing units execute computer-executable instructions to increase processing power and as such, multiple processors can be running simultaneously. The memory 1620 and 1625 may be volatile memory (e.g., registers, cache, RAM), non-volatile memory (e.g., ROM, EEPROM, flash memory, etc.), or some combination of the two. The memory 1620 and 1625 stores software 1680, parameters, and other data that can, for example, implement the technologies described herein. A computing environment may have additional features. For example, the computing environment 1600 includes storage 1640, one or more input devices 1650, one or more output devices 1660, and one or more communication connections 1670. The computing environment 1600 can be coupled to a generator 1665 and/or electrical grid 1667 (e.g., a microgrid). An interconnection mechanism (not shown) such as a bus, a controller, or a network, interconnects the components of the computing environment 1600. Typically, operating system software (not shown) provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and that can be accessed within the computing environment 1600. The storage 1640 stores instructions for the software 1680, which can be used to implement technologies described herein.

The input device(s) 1650 may be a touch input device, such as a keyboard, keypad, mouse, touch screen display, pen, or trackball, a voice input device, a scanning device, or another device, that provides input to the computing environment 1600. For audio, the input device(s) 1650 may be a sound card or similar device that accepts audio input in analog or digital form, or a CD-ROM reader that provides audio samples to the computing environment 1600. The input device(s) 1650 can also include sensors and other suitable transducers for generating data about the generator 1665 and/or grid 1667, for example, voltage measurements, frequency measurements, current measurements, temperature, and other suitable sensor data. The output device(s) 1660 may be a display, printer, speaker, CD-writer, or another device that provides output from the computing environment 1600. The output device(s) 1660 can also include interface circuitry for sending commands and signals to the generators, for example, to increase or decrease field excitation voltage or output voltage of the generator.

The communication connection(s) 1670 enable communication over a communication medium (e.g., a connecting network) to another computing entity. The communication medium conveys information such as computer-executable instructions, compressed graphics information, video, or other data in a adjusted data signal. The communication connection(s) 1670 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers and coordinators. Both wired and wireless connections can be implemented using a network adapter. In a virtual host environment, the communication(s) connections can be a virtualized network connection provided by the virtual host. In some examples, the communication connection(s) 1670 are used to supplement, or in lieu of, the input device(s) 1650 and/or output device(s) 1660 in order to communicate with the generators, sensors, other controllers and AVRs, or smart grid components.

Some embodiments of the disclosed methods can be performed using computer-executable instructions implementing all or a portion of the disclosed technology in a computing cloud 1690. For example, immediate response functions, such as generating regulation signals or field excitation signals can be performed in the computing environment while calculation of parameters for programming the controller can be performed on servers located in the computing cloud 1690.

Computer-readable media are any available media that can be accessed within a computing environment 1600. By way of example, and not limitation, with the computing environment 1600, computer-readable media include memory 1620 and/or storage 1640. As should be readily understood, the term computer-readable storage media includes the media for data storage such as memory 1620 and storage 1640, and not transmission media such as adjusted data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. A system, comprising:
   at least one power generator being situated to supply power to a power grid via an electrical output terminal; and
   a regulator in communication with the at least one power generator and being situated to adjust output voltage of the power generator in response to variations in frequency measured at the electrical output terminal, the regulator comprising:
   a controller programmed to generate a regulation signal responsive to the measured variations in frequency, and
   an automatic voltage regulator (AVR) situated to adjust output voltage of the at least one power generator responsive to the regulation signal by adjusting field excitation current to the at least one power generator.

2. The system of claim 1, wherein the controller calculates a difference between a measured AC frequency and a reference AC frequency for the power grid.

3. The system of claim 1, wherein the controller is a proportional-integral controller or a proportional-integral-differential controller.

4. The system of claim 1, wherein the controller adds an exponential delay to reduce integration error in a proportional-integral controller.

5. The system of claim 1, wherein when the measured frequency is below a nominal value, the regulation signal is selected by the controller to reduce output voltage of the at least one power generator.

6. The system of claim 1, wherein the controller adjusts the regulation signal in response to a frequency deviation and then returns the regulation signal to the nominal value when the frequency deviation has been eliminated.

7. The system of claim 1, wherein the regulator is configured to adjust the output voltage within less than one second of the measured frequency variation.

8. The system of claim 1, further comprising a measurement circuit coupled to the electrical output terminal and situated to measure the frequency variations.

9. The system of claim 1, wherein control gains for the regulator are selected using the Cohen-Coon method.

10. The system of claim 1, wherein control gains for the regulator are selected using a lookup table stored in a computer-readable memory.

11. A system, comprising:
    at least one power generator being situated to supply power to a power grid via an electrical output terminal; and
    a regulator in communication with the at least one power generator and being situated to:
    adjust output voltage of the power generator in response to variations in frequency measured at the electrical output terminal by adjusting field excitation current to the at least one power generator.

12. The system of claim 1, wherein one or more of the at least one power generator are an inverter-connected power source.

13. A method of temporarily adjusting voltage output of a power source coupled to a power grid responsive to behavior of the power grid, the method comprising:
    adjusting voltage output of the power source based on at least one electrical characteristic of the power grid measured at the output of the power source, the adjusting comprising adjusting a bias voltage input for an automatic voltage regulator coupled to the power source.

14. The method of claim 13, wherein the measured at least one electrical characteristic is AC frequency of the electrical grid.

15. The method of claim 13, wherein the power source is a generator, and wherein the adjusting voltage output comprises adjusting an excitation field current of the generator based on the at least one electrical characteristic.

16. The method of claim 13, wherein the measured at least one electrical characteristic is frequency, and wherein the voltage output is adjusted so as to reduce deviation of the measured at least one electrical characteristic.

17. The method of claim 13, wherein the adjusting voltage output comprises adjusting a bias voltage input for an automatic voltage regulator coupled to the power source.

18. A method of temporarily adjusting voltage output of a power source coupled to a power grid responsive to behavior of the power grid, the method comprising:
adjusting voltage output of the power source based on at least one electrical characteristic of the power grid measured at the output of the power source, the adjusting the voltage output comprising selecting a return rate for returning the voltage output to a nominal output level.

19. The method of claim 13, wherein the power source is an electric generator, and wherein an automatic voltage regulator selects the voltage output of the electric generator based on a voltage input of the automatic voltage regulator and on at least one or more of the following: a fixed reference voltage, a terminal voltage, or a bias voltage for the power source.

20. The method of claim 13, wherein the power source is a diesel generator, a diesel-based generator, a gasoline-based generator, a gas-based generator, a wind-based generator, a solar-based generator, a coal-based generator, a nuclear generator, a battery, or a photovoltaic electrical power source.

21. A method of manufacturing an apparatus, the method comprising:
providing a controller for an automatic voltage regulator, the controller comprising a computer-readable storage device or memory storing computer executable instructions that when executed by a processor, cause the controller to perform a method of electrical power regulation, the method comprising:
receiving at least one electrical characteristic measured at the output of a power source,
determining one or more gains for an adjusted voltage based on the at least one electrical characteristic,
generating a regulation signal to temporarily adjust a voltage output of one or more power generators of the power source responsive to a deviation of the at least one electrical characteristic from a nominal value, the regulation signal being based on a function of the gains and the at least one electrical characteristic.

22. The method of claim 21, wherein:
the at least one electrical characteristic is frequency measured at the power source output; and
the regulation signal is selected to cause a receiving one of the power generators to reduce its output voltage when the frequency is less than the nominal value.

23. The method of claim 21, further comprising programming the controller by:
selecting a maximum and a minimum range value for the regulation signal; and
providing computer-executable instructions that clamp the regulation signal between the maximum and the minimum range values.

24. The method of claim 21, further comprising programming the controller by:
selecting a decay rate that determines at least in part an amount of time that elapses before the output returns to a nominal value.

25. The method of claim 21, further comprising:
providing the automatic voltage regulator that generates an excitation field current responsive to the regulation signal.

26. The method of claim 21, wherein the power source is an electrical generator, the method further comprising coupling the electrical generator to a microgrid.

27. The system of claim 11, wherein the regulator further comprises a controller programmed to calculate a difference between a measured AC frequency and a reference AC frequency for the power grid.

28. The system of claim 11, wherein the regulator further comprises a proportional-integral controller or a proportional-integral-differential controller, the respective controller being situated to generate a regulation signal responsive to measured variations in frequency of the power grid.

29. The system of claim 11, wherein when the variations in frequency measured at the electrical output terminal are below a nominal value, a regulation signal is selected by the controller to reduce output voltage of the at least one power generator.

30. The system of claim 11, wherein the regulator further comprises a controller programmed to adjust a regulation signal in response to a frequency deviation and then returns the regulation signal to the nominal value when the frequency deviation has been eliminated.

31. The system of claim 11, wherein the at least one power generator is an inverter-connected power source.

32. The method of claim 18, wherein the measured at least one electrical characteristic is AC frequency of the electrical grid.

33. The method of claim 18, wherein the power source is a generator, and wherein the adjusting voltage output further comprises adjusting an excitation field current of the generator based on the at least one electrical characteristic.

34. The method of claim 18, wherein the measured at least one electrical characteristic is frequency, and wherein the voltage output is adjusted so as to reduce deviation of the measured at least one electrical characteristic.

35. The method of claim 18, wherein the adjusting voltage output further comprises adjusting a bias voltage input for an automatic voltage regulator coupled to the power source.

36. The method of claim 18, wherein the power source is an electric generator, and wherein an automatic voltage regulator selects the voltage output of the electric generator based on a voltage input of the automatic voltage regulator and on at least one or more of the following: a fixed reference voltage, a terminal voltage, or a bias voltage for the power source.

* * * * *

UNITED STATES PATENT AND TRADEMARK OFFICE
CERTIFICATE OF CORRECTION

Page 1 of 1

PATENT NO. : 10,784,686 B2
APPLICATION NO. : 15/875981
DATED : September 22, 2020
INVENTOR(S) : Schneider et al.

It is certified that error appears in the above-identified patent and that said Letters Patent is hereby corrected as shown below:

On the Title Page

Item (57), Line 5, "is coupled is to" should be --is coupled to--.

In the Specification

Column 5,
Line 1, "Fig. 6 it is a" should be --Fig. 6 is a--.
Line 15, "Fig. 10 as a" should be --Fig. 10 is a--.

Column 6,
Line 51, "relevant are having" should be --relevant art having--.

Column 11,
Line 66, "values. While" should be --values.) While--.

Column 15,
Line 55, "Fig. 10 as a" should be --Fig. 10 is a--.

Column 16,
Lines 18-19, "photovoltaics adjust energy output of during" should be --photo voltaics, adjust energy output during--.

Signed and Sealed this
Twenty-seventh Day of December, 2022

Katherine Kelly Vidal
*Director of the United States Patent and Trademark Office*